United States Patent
Sharma et al.

(10) Patent No.: US 11,210,793 B1
(45) Date of Patent: Dec. 28, 2021

(54) MIXED REALITY OBJECT DETECTION

(71) Applicant: Optum Technology, Inc., Eden Prairie, MN (US)

(72) Inventors: Yash Sharma, Noida (IN); Vivek R. Dwivedi, Noida (IN); Anshul Verma, Faridabad (IN)

(73) Assignee: Optum Technology, Inc., Eden Prairie, MN (US)

( * ) Notice: Subject to any disclaimer, the term of this patent is extended or adjusted under 35 U.S.C. 154(b) by 0 days.

(21) Appl. No.: 17/174,896

(22) Filed: Feb. 12, 2021

(51) Int. Cl.
| | |
|---|---|
| *G06T 7/12* | (2017.01) |
| *G06T 7/246* | (2017.01) |
| *G06T 19/00* | (2011.01) |
| *G06K 9/62* | (2006.01) |
| *G06T 7/50* | (2017.01) |
| *G06F 3/01* | (2006.01) |

(52) U.S. Cl.
CPC ............... *G06T 7/12* (2017.01); *G06F 3/013* (2013.01); *G06K 9/6215* (2013.01); *G06T 7/246* (2017.01); *G06T 7/50* (2017.01); *G06T 19/006* (2013.01); *G06K 2209/057* (2013.01); *G06T 2207/10028* (2013.01); *G06T 2207/30196* (2013.01)

(58) Field of Classification Search
None
See application file for complete search history.

(56) References Cited

U.S. PATENT DOCUMENTS

| | | |
|---|---|---|
| 7,003,136 B1 | 2/2006 | Harville |
| 10,089,781 B2 | 10/2018 | Huang et al. |
| 10,803,608 B1 | 10/2020 | Na et al. |
| 2010/0074532 A1* | 3/2010 | Gordon .................... G06T 7/536 382/203 |
| 2016/0292868 A1* | 10/2016 | Hu ........................... G06T 17/20 |
| 2018/0061069 A1 | 3/2018 | Higaki et al. |
| 2018/0188355 A1* | 7/2018 | Bao ........................ G01S 17/931 |
| 2018/0232583 A1 | 8/2018 | Wang et al. |
| 2018/0247427 A1* | 8/2018 | Geiger ............... G06K 9/00201 |

(Continued)

FOREIGN PATENT DOCUMENTS

| | | |
|---|---|---|
| KR | 10-2098929 B1 | 4/2020 |

OTHER PUBLICATIONS

Notice of Allowance and Fee(s) Due for U.S. Appl. No. 17/174,929, dated Feb. 12, 2021, (26 pages), United States Patent and Trademark Office, USA.

(Continued)

*Primary Examiner* — Frank S Chen
(74) *Attorney, Agent, or Firm* — Alston & Bird LLP

(57) ABSTRACT

In general, embodiments of the present invention provide methods, apparatuses, systems, computing devices, computing entities, and/or the like for performing mixed reality processing using at least one of depth-based partitioning of a point cloud capture data object, object-based partitioning of a point cloud capture data object, mapping a partitioned point cloud capture data object to detected objects of a three-dimensional scan data object, performing noise filtering on point cloud capture data objects based at least in part on geometric inferences from three-dimensional scan data objects, and performing geometrically-aware object detection using point cloud capture data objects based at least in part on geometric inferences from three-dimensional scan data objects.

20 Claims, 18 Drawing Sheets

(56) References Cited

U.S. PATENT DOCUMENTS

| | | |
|---|---|---|
| 2018/0344412 A1 | 12/2018 | Esterberg |
| 2019/0122425 A1 | 4/2019 | Sheffield |
| 2019/0179024 A1 | 6/2019 | Englard et al. |
| 2019/0365498 A1 | 12/2019 | Gibby et al. |
| 2020/0013224 A1 | 1/2020 | Cvetko et al. |
| 2020/0085511 A1 | 3/2020 | Oezbek et al. |
| 2020/0302632 A1 | 9/2020 | Sejin |
| 2020/0314435 A1 | 10/2020 | Tourapis et al. |
| 2020/0327151 A1 | 10/2020 | Coquard et al. |
| 2021/0255637 A1* | 8/2021 | Kale ............ G05D 1/0248 |

OTHER PUBLICATIONS

Chien, Jong-Chih et al. "HoloLens-Based AR System With A Robust Point Set Registration Algorithm," Sensors, vol. 19, No. 16:3555, Aug. 15, 2019, pp. 1-14. DOI: 10.3390/s19163555. PMCID: PMC6721543. PMID: 31443237.

Leal, Esmeide et al. "Sparse Regularization-Based Approach For Point Cloud Denoising and Sharp Features Enhancement," Sensors, vol. 20, No. 11:3206, Jun. 5, 2020, pp. 1-18. DOI: 10.3390/s20113206. PMCID: PMC7313689. PMID: 32516976.

Loménie, Nicolas. "A Generic Methodology for Partitioning Unorganized 3D Point Clouds for Robotic Vision," In First Canadian Conference on Computer and Robot Vision, May 2004, (8 pages). IEEE.

Sim, Jae-Young et al. "Construction of Regular 3D Point Clouds Using Octree Partitioning and Resampling," In 2005 IEEE International Symposium On Circuits and Systems, vol. 2, May 23-26, 2005, pp. 956-959. Kobe, Japan. DOI: 10.1109/ISCAS.2005.1464748.

\* cited by examiner

```
                                                                    405
                                                                   ↙

┌─────────────────────────────────────────────────────────────────────┐
│ Perform scene analysis operations on the three-dimensional scan data│
│         object to generate a scan configuration data object         │
│                                 701                                 │
└─────────────────────────────────────────────────────────────────────┘
                                  │
                                  ▼
┌─────────────────────────────────────────────────────────────────────┐
│    Map each detected object associated with the point cloud capture │
│           data object to the three-dimensional scan data object     │
│                                 702                                 │
└─────────────────────────────────────────────────────────────────────┘
                                  │
                                  ▼
┌─────────────────────────────────────────────────────────────────────┐
│      Generate an environment mapping data object for each detected  │
│                               object                                │
│                                 703                                 │
└─────────────────────────────────────────────────────────────────────┘
                                  │
                                  ▼
┌─────────────────────────────────────────────────────────────────────┐
│    Provide each environment mapping data object to the noise        │
│                          filtering engine                           │
│                                 704                                 │
└─────────────────────────────────────────────────────────────────────┘
```

┌─────────────────────────────────────────────────────┐
    │                                                     │
    │  Identify the plurality of object-based point cloud partitions  │
    │                       1401                          │
    │                                                     │
    └─────────────────────────────────────────────────────┘
                              │
                              ▼
    ┌─────────────────────────────────────────────────────┐
    │  Perform preprocessing operations on each object-based point cloud  │
    │  partition to generate a preprocessed object-based point cloud partition  │
    │                       1402                          │
    └─────────────────────────────────────────────────────┘
                              │
                              ▼
    ┌─────────────────────────────────────────────────────┐
    │  Perform WLOP filtering operations on the plurality of preprocessed object-  │
    │  based point cloud partitions to generate a plurality of refined point cloud  │
    │                      partitions                     │
    │                       1403                          │
    └─────────────────────────────────────────────────────┘
```

FIG. 14

MIXED REALITY OBJECT DETECTION

BACKGROUND

Various embodiments of the present invention address technical challenges related to performing mixed reality (MR) processing.

BRIEF SUMMARY

In general, embodiments of the present invention provide methods, apparatuses, systems, computing devices, computing entities, and/or the like for performing mixed reality processing using at least one of depth-based partitioning of a point cloud capture data object, object-based partitioning of a point cloud capture data object, mapping a partitioned point cloud capture data object to detected objects of a three-dimensional scan data object, performing noise filtering on point cloud capture data objects based at least in part on geometric inferences from three-dimensional scan data objects, and performing geometrically-aware object detection using point cloud capture data objects based at least in part on geometric inferences from three-dimensional scan data objects.

In accordance with one aspect, a method includes: identifying a point cloud capture data object associated with an environment of interest, wherein: (i) the point cloud capture data object comprises a plurality of point cloud points, and (ii) each point cloud point of the plurality of point cloud points is associated with an inferred depth value; determining plurality of depth-based point cloud partitions for the point cloud capture data object based at least in part on each inferred depth-value for a point cloud point of the plurality of point cloud points; for each depth-based point cloud partition of the plurality of depth-based point cloud partitions, determining whether the depth-based point cloud partition comprises a set of detected object outer linings; generating a plurality of object-based point cloud partitions based at least in part on the plurality of depth-based point cloud partitions and each set of detected object outer linings for a depth-based point cloud partition of the plurality of depth-based point cloud partitions; generating a mixed reality output based at least in part on the plurality of object-based point cloud partitions; and performing one or more rendering-based actions based at least in part on the noted mixed reality output.

In some embodiments, generating the mixed reality output comprises: determining an initial set of detected objects for the environment of interest based at least in part on each set of detected object outer linings for a depth-based point cloud partition of the plurality of depth-based point cloud partitions; for each initial detected object of the initial set of detected objects: determining a mapping of the initial detected object to a three-dimensional region three-dimensional scan data object of the environment of interest, and determining an environmental mapping data object for the initial detected object based at least in part on one or more inferred geometric properties of the three-dimensional region; and generating the mixed reality output based at least in part on each environmental mapping data object for an initial detected object of the initial set of detected objects. In some embodiments, generating the mixed reality output based at least in part on each environmental mapping data object for an initial detected object of the initial set of detected objects comprises: performing one or more noise filtering operations on the plurality of object-based point cloud partitions based at least in part on each environmental mapping data object for an initial detected object of the initial set of detected objects to generate a plurality of refined point cloud partitions; and generating the mixed reality output based at least in part on the plurality of refined point cloud partitions. In some embodiments, the one or more noise filtering operations comprise one or more weighted locally optimal projection noise filtering operations. In some embodiments, the one or more weighted locally optimal projection noise filtering operations are configured to: generate a refined point cloud capture data object by excluding a subset of the plurality of point cloud points that fail to conform to at least one environmental mapping data object for an initial detected object of the initial set of detected objects, and generate the plurality of refined point cloud partitions based at least in part on the refined point cloud capture data object. In some embodiments, generating the plurality of refined point cloud partitions based at least in part on the refined point cloud capture data object comprises: performing a depth-based partitioning of the refined point cloud capture data object to generate the plurality of refined point cloud partitions. In some embodiments, generating the mixed reality output based at least in part on the plurality of refined point cloud partitions comprises: generating a continual mapping data object for the refined point cloud capture data object; processing the continual mapping data object using a required number of outline matching operations until a terminal outline matching iteration that results in a terminal continual mapping data object that is associated with a set of inferred object outlines having a threshold-satisfying outline matching similarity measure in relation to one or more geometric properties of the set of detected objects; and generating the mixed reality output based at least in part on the terminal continual mapping data object. In some embodiments, the set of inferred object outlines correspond to a set of user-defined object types. In some embodiments, the set of user-defined object types comprise a hand object type. In some embodiments, the set of user-defined object types comprise a body object type. In some embodiments, the set of user-defined object types comprise a surgical instrument object type. In some embodiments, the set of user-defined object types comprise a body part object type.

In accordance with another aspect, an apparatus comprising at least one processor and at least one memory including program code, the at least one memory and the program code configured to, with the processor, cause the apparatus to at least: identify a point cloud capture data object associated with an environment of interest, wherein: (i) the point cloud capture data object comprises a plurality of point cloud points, and (ii) each point cloud point of the plurality of point cloud points is associated with an inferred depth value; determine plurality of depth-based point cloud partitions for the point cloud capture data object based at least in part on each inferred depth-value for a point cloud point of the plurality of point cloud points; for each depth-based point cloud partition of the plurality of depth-based point cloud partitions, determine whether the depth-based point cloud partition comprises a set of detected object outer linings; generate a plurality of object-based point cloud partitions based at least in part on the plurality of depth-based point cloud partitions and each set of detected object outer linings for a depth-based point cloud partition of the plurality of depth-based point cloud partitions; generate a mixed reality output based at least in part on the plurality of object-based point cloud partitions; and perform one or more rendering-based actions based at least in part on the noted mixed reality output.

In some embodiments, generating the mixed reality output comprises: determining an initial set of detected objects for the environment of interest based at least in part on each set of detected object outer linings for a depth-based point cloud partition of the plurality of depth-based point cloud partitions; for each initial detected object of the initial set of detected objects: determining a mapping of the initial detected object to a three-dimensional region three-dimensional scan data object of the environment of interest, and determining an environmental mapping data object for the initial detected object based at least in part on one or more inferred geometric properties of the three-dimensional region; and generating the mixed reality output based at least in part on each environmental mapping data object for an initial detected object of the initial set of detected objects. In some embodiments, generating the mixed reality output based at least in part on each environmental mapping data object for an initial detected object of the initial set of detected objects comprises: performing one or more noise filtering operations on the plurality of object-based point cloud partitions based at least in part on each environmental mapping data object for an initial detected object of the initial set of detected objects to generate a plurality of refined point cloud partitions; and generating the mixed reality output based at least in part on the plurality of refined point cloud partitions. In some embodiments, the one or more noise filtering operations comprise one or more weighted locally optimal projection noise filtering operations. In some embodiments, the one or more weighted locally optimal projection noise filtering operations are configured to: generate a refined point cloud capture data object by excluding a subset of the plurality of point cloud points that fail to conform to at least one environmental mapping data object for an initial detected object of the initial set of detected objects, and generate the plurality of refined point cloud partitions based at least in part on the refined point cloud capture data object. In some embodiments, generating the plurality of refined point cloud partitions based at least in part on the refined point cloud capture data object comprises: performing a depth-based partitioning of the refined point cloud capture data object to generate the plurality of refined point cloud partitions. In some embodiments, generating the mixed reality output based at least in part on the plurality of refined point cloud partitions comprises: generating a continual mapping data object for the refined point cloud capture data object; processing the continual mapping data object using a required number of outline matching operations until a terminal outline matching iteration that results in a terminal continual mapping data object that is associated with a set of inferred object outlines having a threshold-satisfying outline matching similarity measure in relation to one or more geometric properties of the set of detected objects; and generating the mixed reality output based at least in part on the terminal continual mapping data object. In some embodiments, the set of inferred object outlines correspond to a set of user-defined object types. In some embodiments, the set of user-defined object types comprise a hand object type. In some embodiments, the set of user-defined object types comprise a body object type. In some embodiments, the set of user-defined object types comprise a surgical instrument object type. In some embodiments, the set of user-defined object types comprise a body part object type.

In accordance with yet another aspect, a computer program product computer program comprising at least one non-transitory computer-readable storage medium having computer-readable program code portions stored therein, the computer-readable program code portions configured to: identify a point cloud capture data object associated with an environment of interest, wherein: (i) the point cloud capture data object comprises a plurality of point cloud points, and (ii) each point cloud point of the plurality of point cloud points is associated with an inferred depth value; determine plurality of depth-based point cloud partitions for the point cloud capture data object based at least in part on each inferred depth-value for a point cloud point of the plurality of point cloud points; for each depth-based point cloud partition of the plurality of depth-based point cloud partitions, determine whether the depth-based point cloud partition comprises a set of detected object outer linings; generate a plurality of object-based point cloud partitions based at least in part on the plurality of depth-based point cloud partitions and each set of detected object outer linings for a depth-based point cloud partition of the plurality of depth-based point cloud partitions; generate a mixed reality output based at least in part on the plurality of object-based point cloud partitions; and perform one or more rendering-based actions based at least in part on the noted mixed reality output.

In some embodiments, generating the mixed reality output comprises: determining an initial set of detected objects for the environment of interest based at least in part on each set of detected object outer linings for a depth-based point cloud partition of the plurality of depth-based point cloud partitions; for each initial detected object of the initial set of detected objects: determining a mapping of the initial detected object to a three-dimensional region three-dimensional scan data object of the environment of interest, and determining an environmental mapping data object for the initial detected object based at least in part on one or more inferred geometric properties of the three-dimensional region; and generating the mixed reality output based at least in part on each environmental mapping data object for an initial detected object of the initial set of detected objects. In some embodiments, generating the mixed reality output based at least in part on each environmental mapping data object for an initial detected object of the initial set of detected objects comprises: performing one or more noise filtering operations on the plurality of object-based point cloud partitions based at least in part on each environmental mapping data object for an initial detected object of the initial set of detected objects to generate a plurality of refined point cloud partitions; and generating the mixed reality output based at least in part on the plurality of refined point cloud partitions. In some embodiments, the one or more noise filtering operations comprise one or more weighted locally optimal projection noise filtering operations. In some embodiments, the one or more weighted locally optimal projection noise filtering operations are configured to: generate a refined point cloud capture data object by excluding a subset of the plurality of point cloud points that fail to conform to at least one environmental mapping data object for an initial detected object of the initial set of detected objects, and generate the plurality of refined point cloud partitions based at least in part on the refined point cloud capture data object. In some embodiments, generating the plurality of refined point cloud partitions based at least in part on the refined point cloud capture data object comprises: performing a depth-based partitioning of the refined point cloud capture data object to generate the plurality of refined point cloud partitions. In some embodiments, generating the mixed reality output based at least in part on the plurality of refined point cloud partitions comprises: generating a continual mapping data object for the refined point cloud capture data object; processing the continual mapping data object using a required number of outline matching operations until a terminal outline matching iteration that results in a terminal continual mapping data object that is associated with a set of inferred object outlines having a threshold-satisfying outline matching similarity measure in relation to one or more geometric properties of the set of detected objects; and generating the mixed reality output based at least in part on the terminal continual mapping data object. In some embodiments, the set of inferred object outlines correspond to a set of user-defined object types. In some embodiments, the set of user-defined object types comprise a hand object type. In some embodiments, the set of user-defined object types comprise a body object type. In some embodiments, the set of user-defined object types comprise a surgical instrument object type. In some embodiments, the set of user-defined object types comprise a body part object type.

In accordance with an additional aspect, a method includes: identifying one or more input point cloud partitions associated with an input point cloud capture data object of an environment of interest; identifying one or more geometric features for each target object of a plurality of target objects in the environment of interest, wherein the plurality of target objects comprise one or more low movement target objects and one or more high movement target objects; determining, based at least in part on the one or more input point cloud partitions, one or more low movement detected objects in the environment of interest and one or more high movement detected objects in the environment of interest; determining a continual mapping data object for the environment of interest by mapping the one or more low movement detected objects to the one or more low movement target objects and the one or more high movement detected objects to the one or more high movement detected objects; determining a mixed reality output based at least in part on the continual mapping data object; and performing one or more rendering-based actions based at least in part on the mixed reality output.

In some embodiments, determining the mixed reality output comprises: processing the continual mapping data object using a required number of outline matching operations until a terminal outline matching iteration that results in a continual mapping data object that is associated with a set of inferred object outlines having a threshold-satisfying outline matching similarity measure in relation to one or more geometric properties of the plurality of target objects; and generating the mixed reality output based at least in part on the terminal continual mapping data object. In some embodiments, the set of inferred object outlines correspond to a set of user-defined object types. In some embodiments, the set of inferred object outlines correspond to a set of user-defined object types. In some embodiments, the set of user-defined object types comprise a hand object type. In some embodiments, the set of user-defined object types comprise a body object type. In some embodiments, the set of user-defined object types comprise a surgical instrument object type. In some embodiments, the set of user-defined object types comprise a body part object type. In some embodiments, the set of user-defined object types are determined based at least in part on an intent determination data object for an end user profile in the environment of interest. In some embodiments, the intent determination data object is determined based at least in part on processing eye tracking data associated with the end user profile to identify a focal point of interest for the end user profile. In some embodiments, generating the one or more input point cloud partitions comprises: identifying the input point cloud capture data object associated with the environment of interest, wherein: (i) the input point cloud capture data object comprises a plurality of point cloud points, and (ii) each point cloud point of the plurality of point cloud points is associated with an inferred depth value; determining a plurality of depth-based point cloud partitions for the input point cloud capture data object based at least in part on each inferred depth-value for a point cloud point of the plurality of point cloud points; for each depth-based point cloud partition of the plurality of depth-based point cloud partitions, determining whether the depth-based point cloud partition comprises a set of detected object outer linings; generating a plurality of object-based point cloud partitions based at least in part on the plurality of depth-based point cloud partitions and each set of detected object outer linings for a depth-based point cloud partition of the plurality of depth-based point cloud partitions; and generating the one or more input point cloud partitions based on the plurality of object-based point cloud partitions.

In accordance with another aspect, an apparatus comprising at least one processor and at least one memory including program code, the at least one memory and the program code configured to, with the processor, cause the apparatus to at least: identify one or more input point cloud partitions associated with an input point cloud capture data object of an environment of interest; identify one or more geometric features for each target object of a plurality of target objects in the environment of interest, wherein the plurality of target objects comprise one or more low movement target objects and one or more high movement target objects; determine, based at least in part on the one or more input point cloud partitions, one or more low movement detected objects in the environment of interest and one or more high movement detected objects in the environment of interest; determine a continual mapping data object for the environment of interest by mapping the one or more low movement detected objects to the one or more low movement target objects and the one or more high movement detected objects to the one or more high movement detected objects; determine a mixed reality output based at least in part on the continual mapping data object; and perform one or more rendering-based actions based at least in part on the mixed reality output.

In some embodiments, determining the mixed reality output comprises: processing the continual mapping data object using a required number of outline matching operations until a terminal outline matching iteration that results in a continual mapping data object that is associated with a set of inferred object outlines having a threshold-satisfying outline matching similarity measure in relation to one or more geometric properties of the plurality of target objects; and generating the mixed reality output based at least in part on the terminal continual mapping data object. In some embodiments, the set of inferred object outlines correspond to a set of user-defined object types. In some embodiments, the set of inferred object outlines correspond to a set of user-defined object types. In some embodiments, the set of user-defined object types comprise a hand object type. In some embodiments, the set of user-defined object types comprise a body object type. In some embodiments, the set of user-defined object types comprise a surgical instrument object type. In some embodiments, the set of user-defined object types comprise a body part object type. In some embodiments, the set of user-defined object types are determined based at least in part on an intent determination data object for an end user profile in the environment of interest. In some embodiments, the intent determination data object is determined based at least in part on processing eye tracking data associated with the end user profile to identify a focal point of interest for the end user profile. In some embodiments, generating the one or more input point cloud partitions comprises: identifying the input point cloud capture data object associated with the environment of interest, wherein: (i) the input point cloud capture data object comprises a plurality of point cloud points, and (ii) each point cloud point of the plurality of point cloud points is associated with an inferred depth value; determining a plurality of depth-based point cloud partitions for the input point cloud capture data object based at least in part on each inferred depth-value for a point cloud point of the plurality of point cloud points; for each depth-based point cloud partition of the plurality of depth-based point cloud partitions, determining whether the depth-based point cloud partition comprises a set of detected object outer linings; generating a plurality of object-based point cloud partitions based at least in part on the plurality of depth-based point cloud partitions and each set of detected object outer linings for a depth-based point cloud partition of the plurality of depth-based point cloud partitions; and generating the one or more input point cloud partitions based on the plurality of object-based point cloud partitions.

In accordance with yet another aspect, a computer program product computer program comprising at least one non-transitory computer-readable storage medium having computer-readable program code portions stored therein, the computer-readable program code portions configured to: identify one or more input point cloud partitions associated with an input point cloud capture data object of an environment of interest; identify one or more geometric features for each target object of a plurality of target objects in the environment of interest, wherein the plurality of target objects comprise one or more low movement target objects and one or more high movement target objects; determine, based at least in part on the one or more input point cloud partitions, one or more low movement detected objects in the environment of interest and one or more high movement detected objects in the environment of interest; determine a continual mapping data object for the environment of interest by mapping the one or more low movement detected objects to the one or more low movement target objects and the one or more high movement detected objects to the one or more high movement target objects; determine a mixed reality output based at least in part on the continual mapping data object; and perform one or more rendering-based actions based at least in part on the mixed reality output.

In some embodiments, determining the mixed reality output comprises: processing the continual mapping data object using a required number of outline matching operations until a terminal outline matching iteration that results in a continual mapping data object that is associated with a set of inferred object outlines having a threshold-satisfying outline matching similarity measure in relation to one or more geometric properties of the plurality of target objects; and generating the mixed reality output based at least in part on the terminal continual mapping data object. In some embodiments, the set of inferred object outlines correspond to a set of user-defined object types. In some embodiments, the set of inferred object outlines correspond to a set of user-defined object types. In some embodiments, the set of user-defined object types comprise a hand object type. In some embodiments, the set of user-defined object types comprise a body object type. In some embodiments, the set of user-defined object types comprise a surgical instrument object type. In some embodiments, the set of user-defined object types comprise a body part object type. In some embodiments, the set of user-defined object types are determined based at least in part on an intent determination data object for an end user profile in the environment of interest. In some embodiments, the intent determination data object is determined based at least in part on processing eye tracking data associated with the end user profile to identify a focal point of interest for the end user profile. In some embodiments, generating the one or more input point cloud partitions comprises: identifying the input point cloud capture data object associated with the environment of interest, wherein: (i) the input point cloud capture data object comprises a plurality of point cloud points, and (ii) each point cloud point of the plurality of point cloud points is associated with an inferred depth value; determining a plurality of depth-based point cloud partitions for the input point cloud capture data object based at least in part on each inferred depth-value for a point cloud point of the plurality of point cloud points; for each depth-based point cloud partition of the plurality of depth-based point cloud partitions, determining whether the depth-based point cloud partition comprises a set of detected object outer linings; generating a plurality of object-based point cloud partitions based at least in part on the plurality of depth-based point cloud partitions and each set of detected object outer linings for a depth-based point cloud partition of the plurality of depth-based point cloud partitions; and generating the one or more input point cloud partitions based on the plurality of object-based point cloud partitions.

BRIEF DESCRIPTION OF THE DRAWINGS

Figure 1:
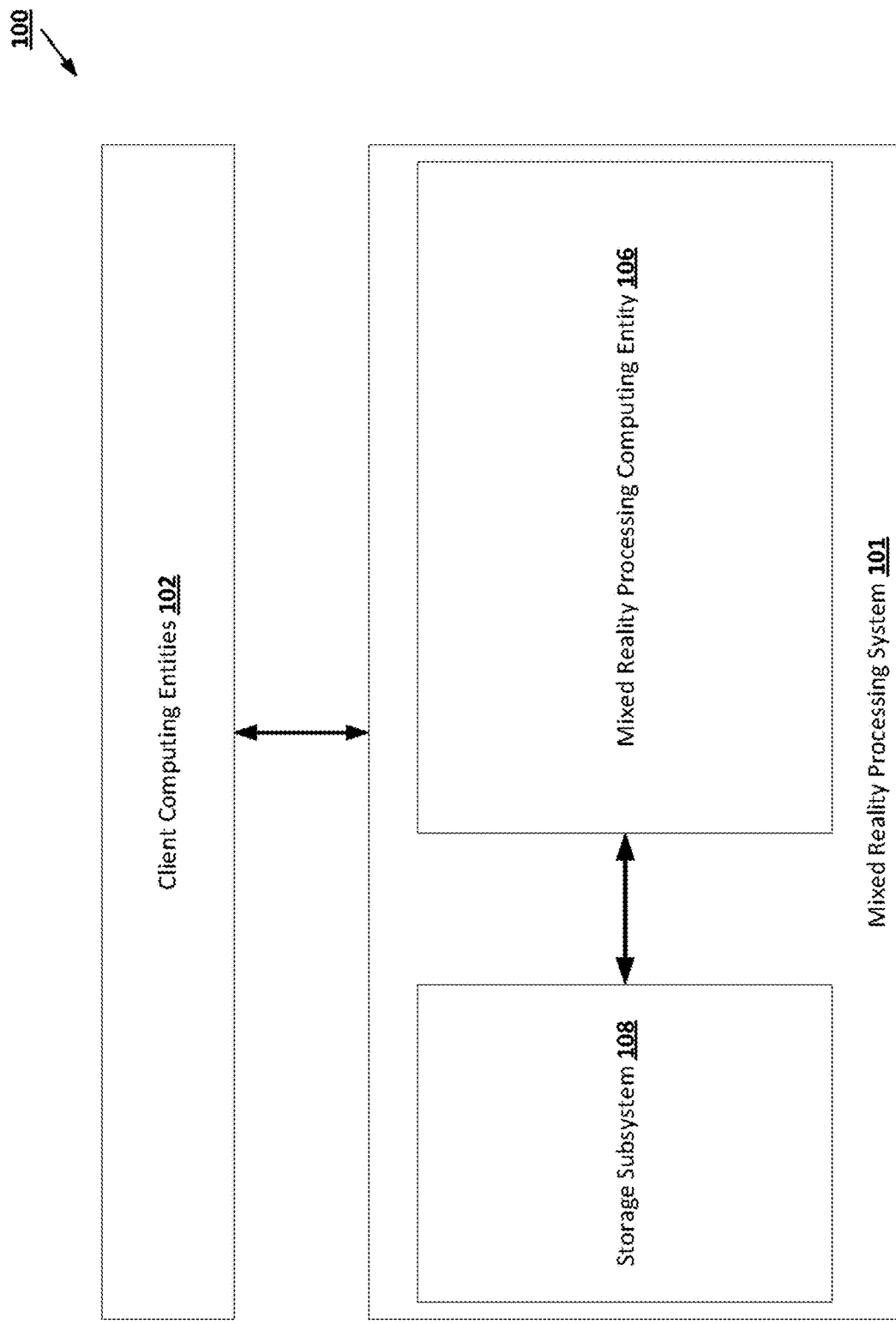
Figure 2:
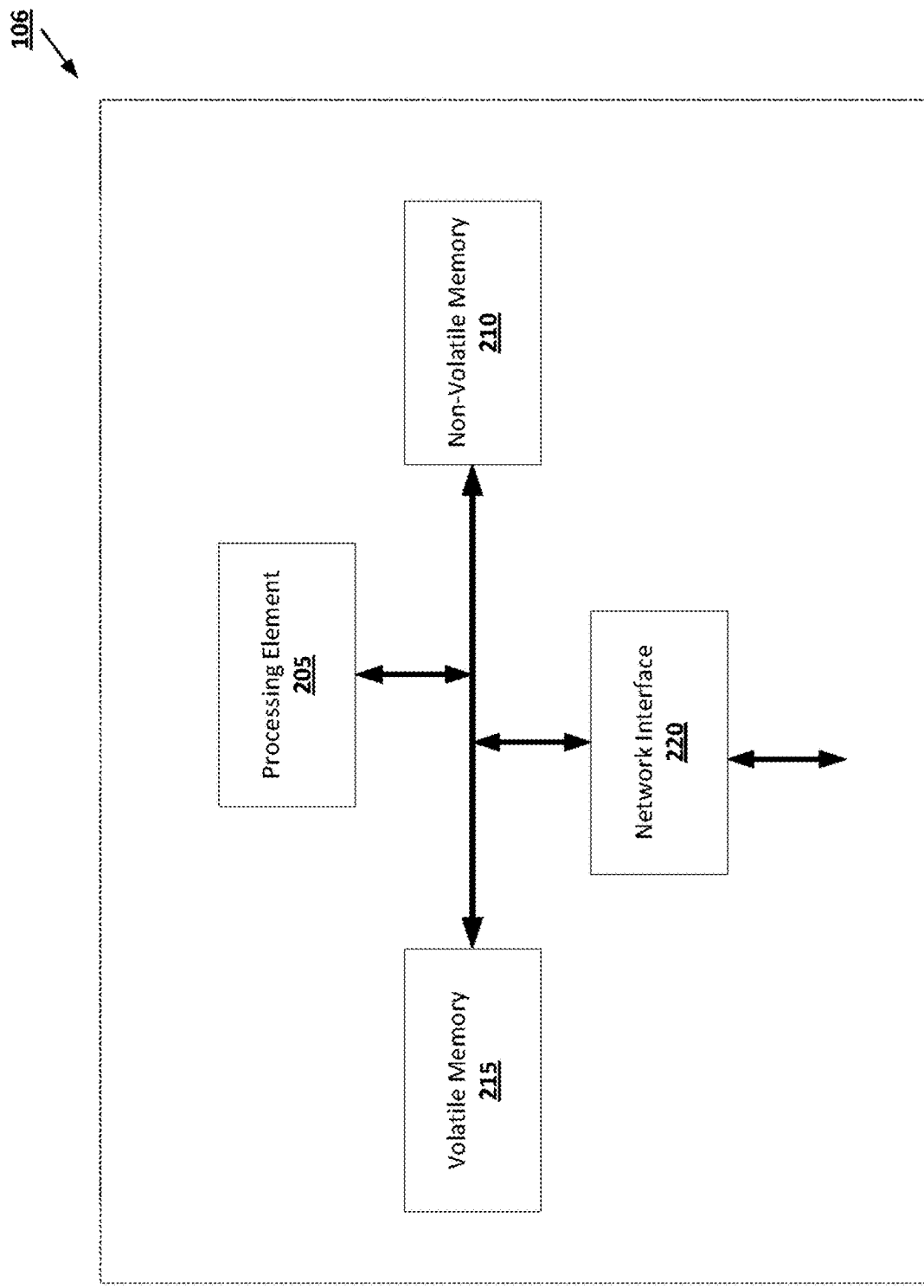
Figure 3:
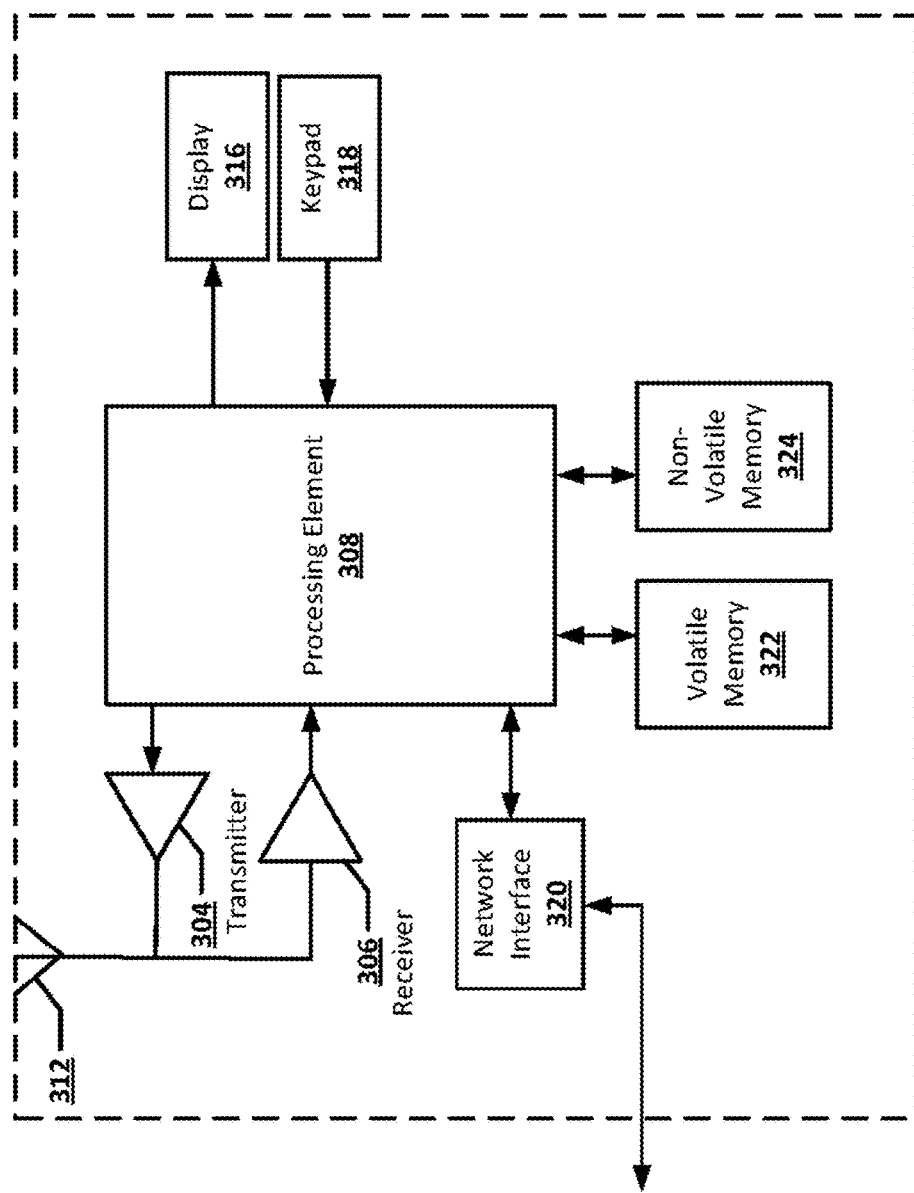
Figure 4:
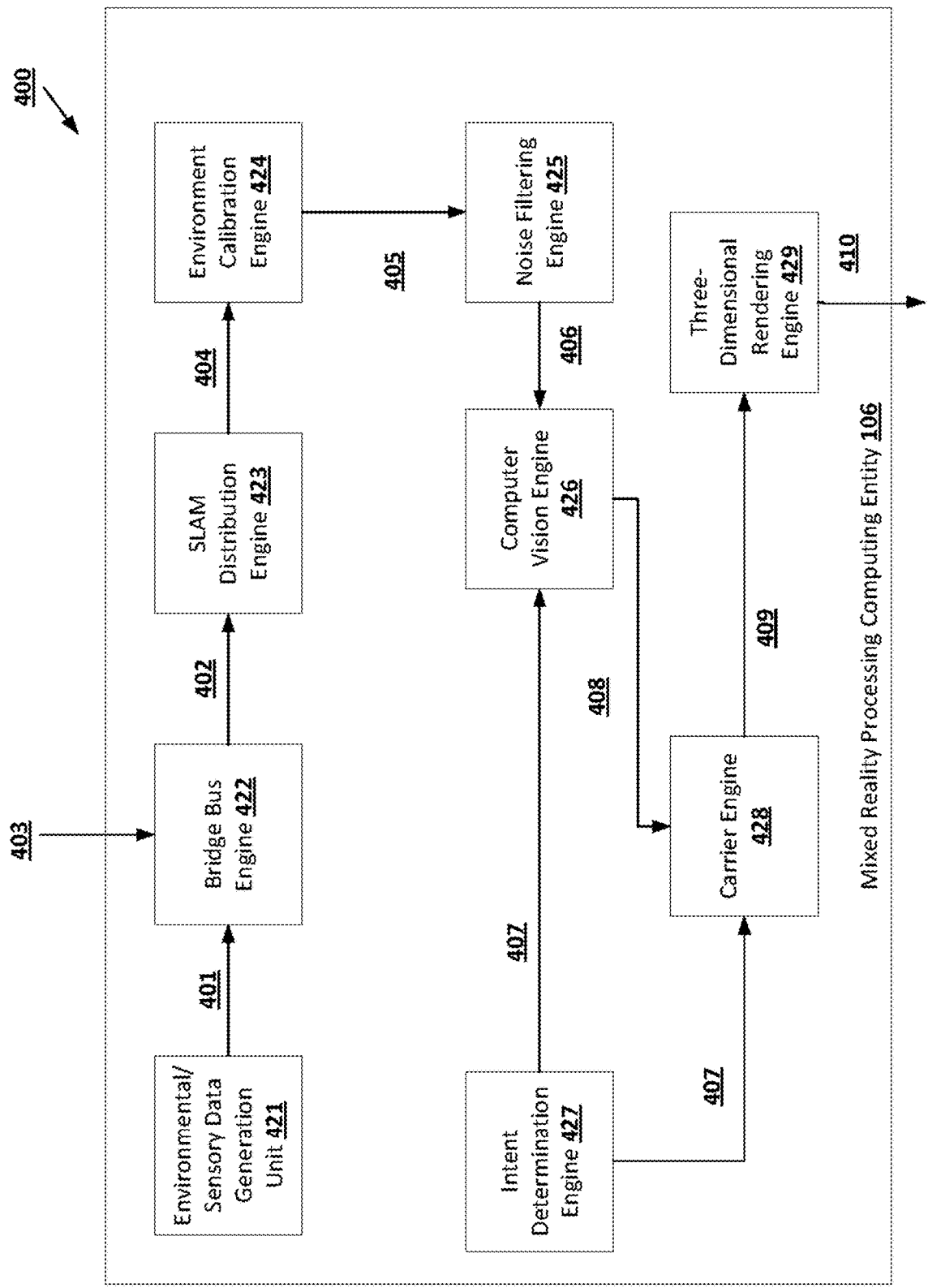
Figure 5:
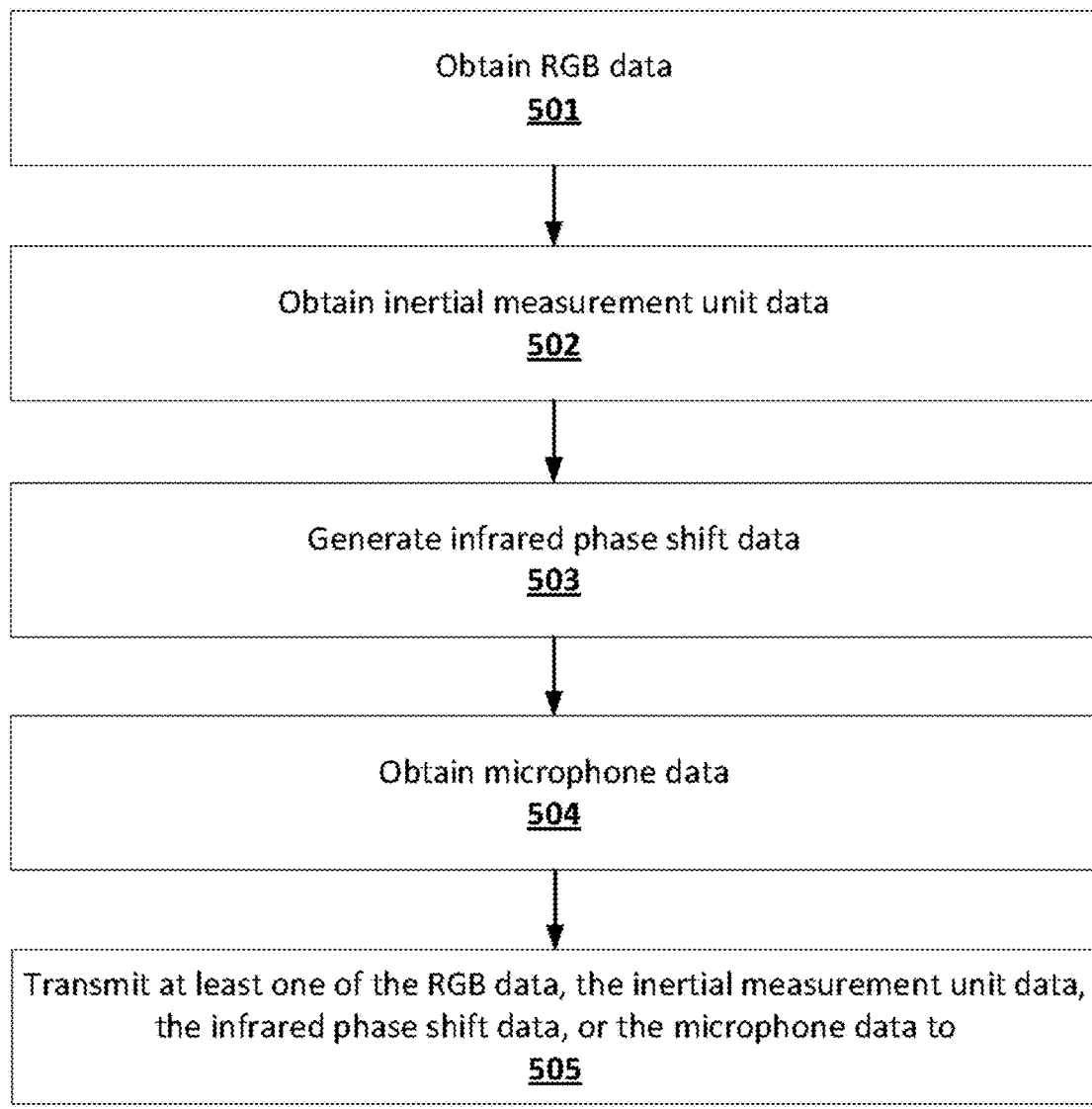
Figure 6:
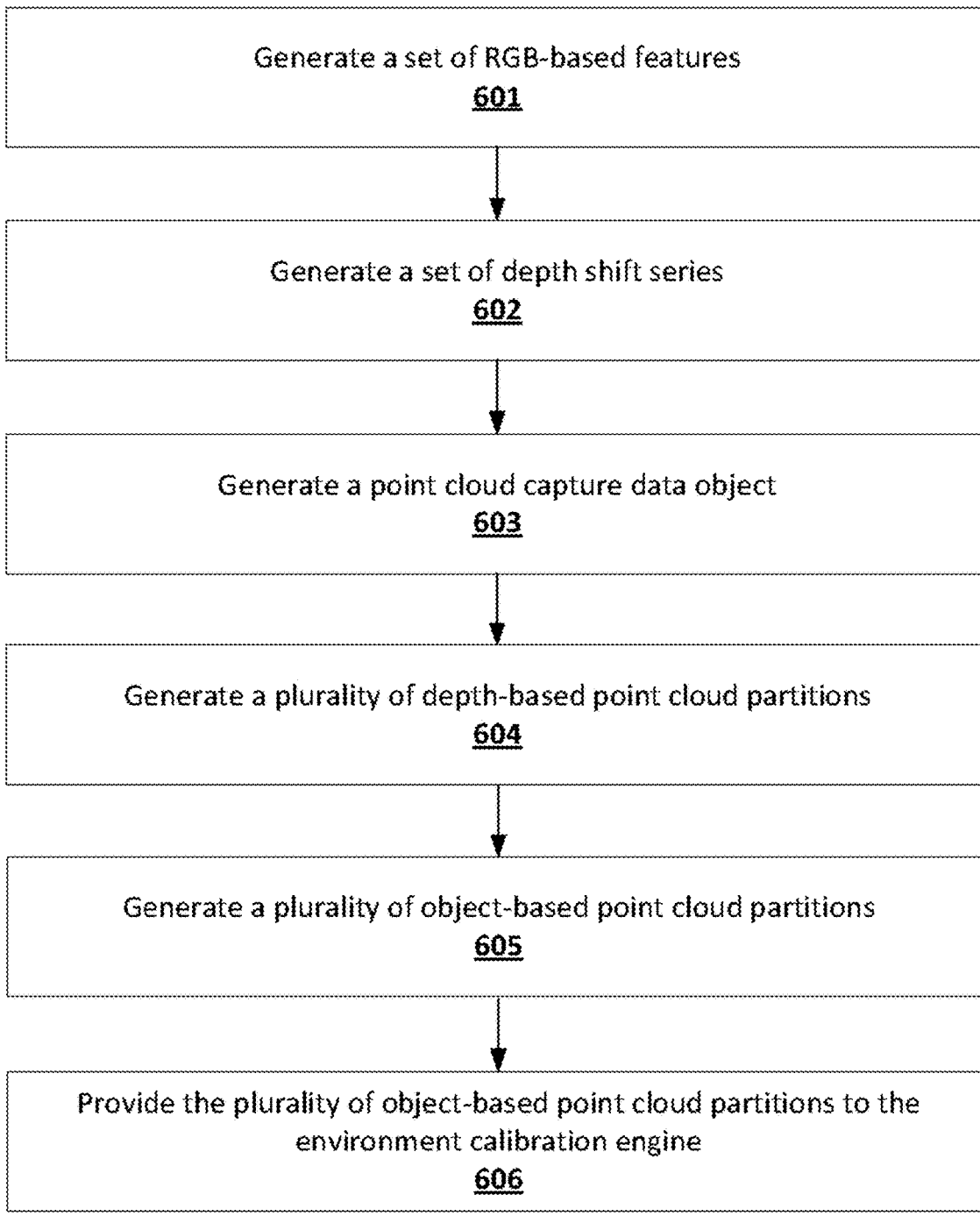
Figure 8:
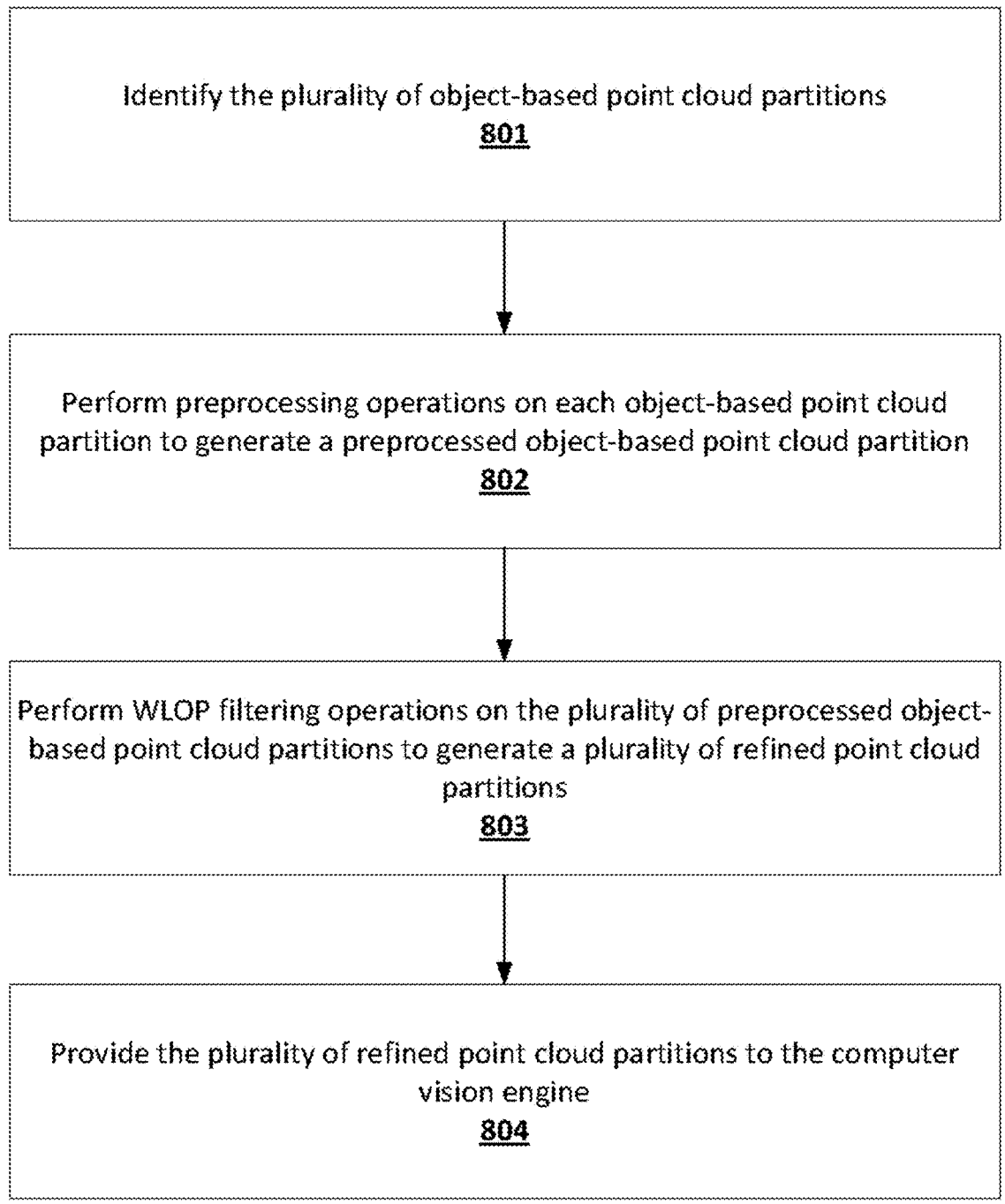
Figure 9:
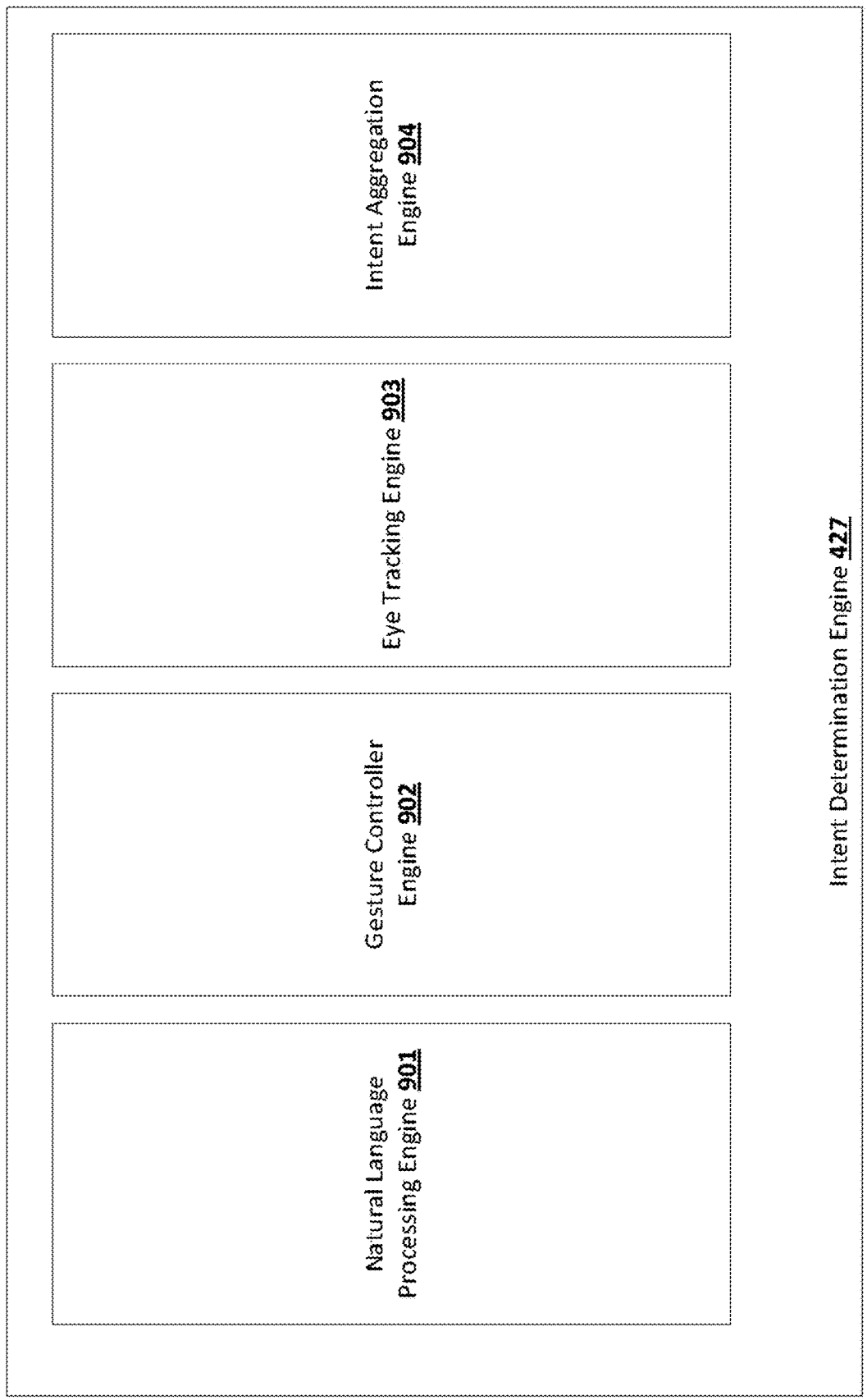
Figure 10:
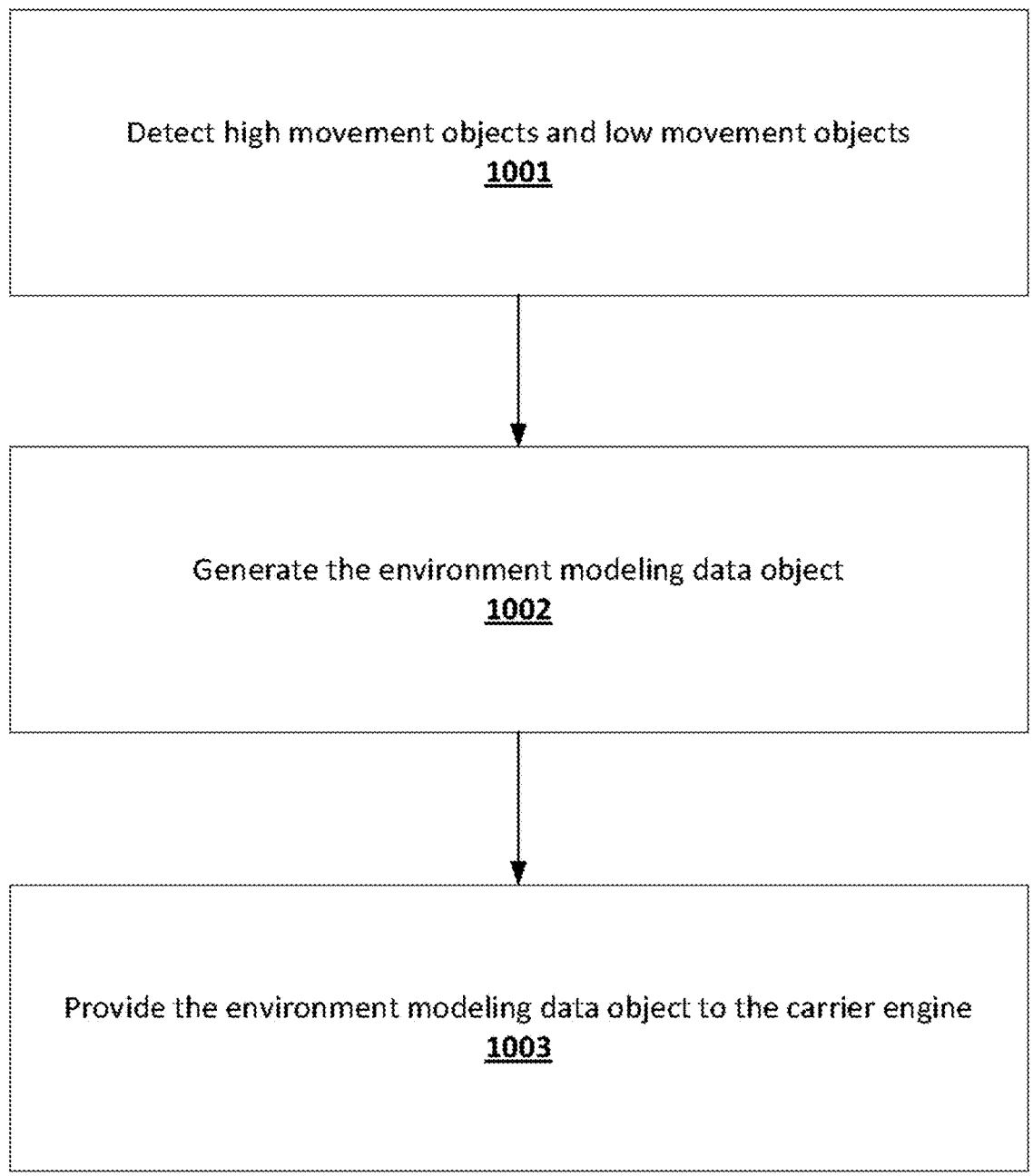
Figure 12:
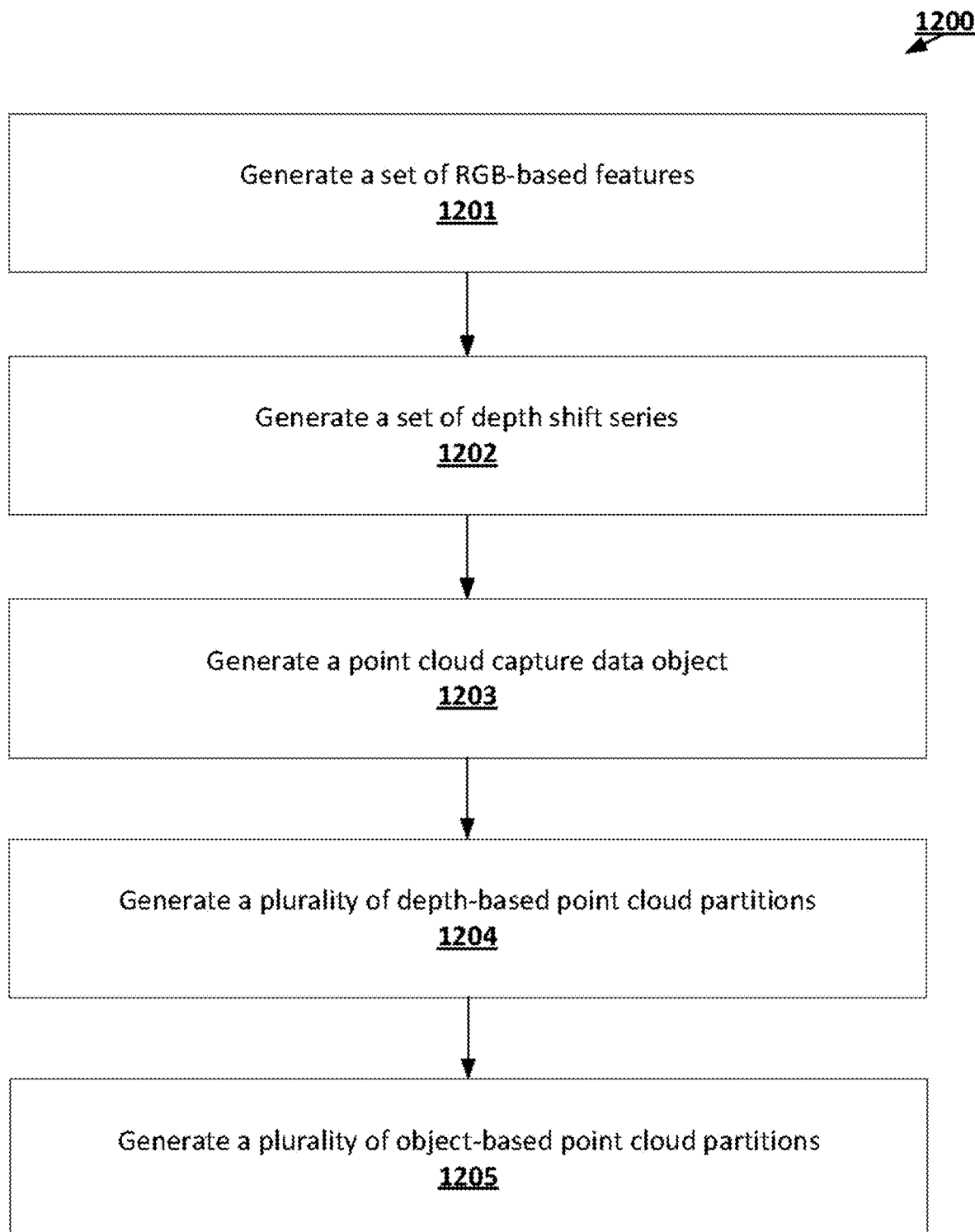
Figure 13:
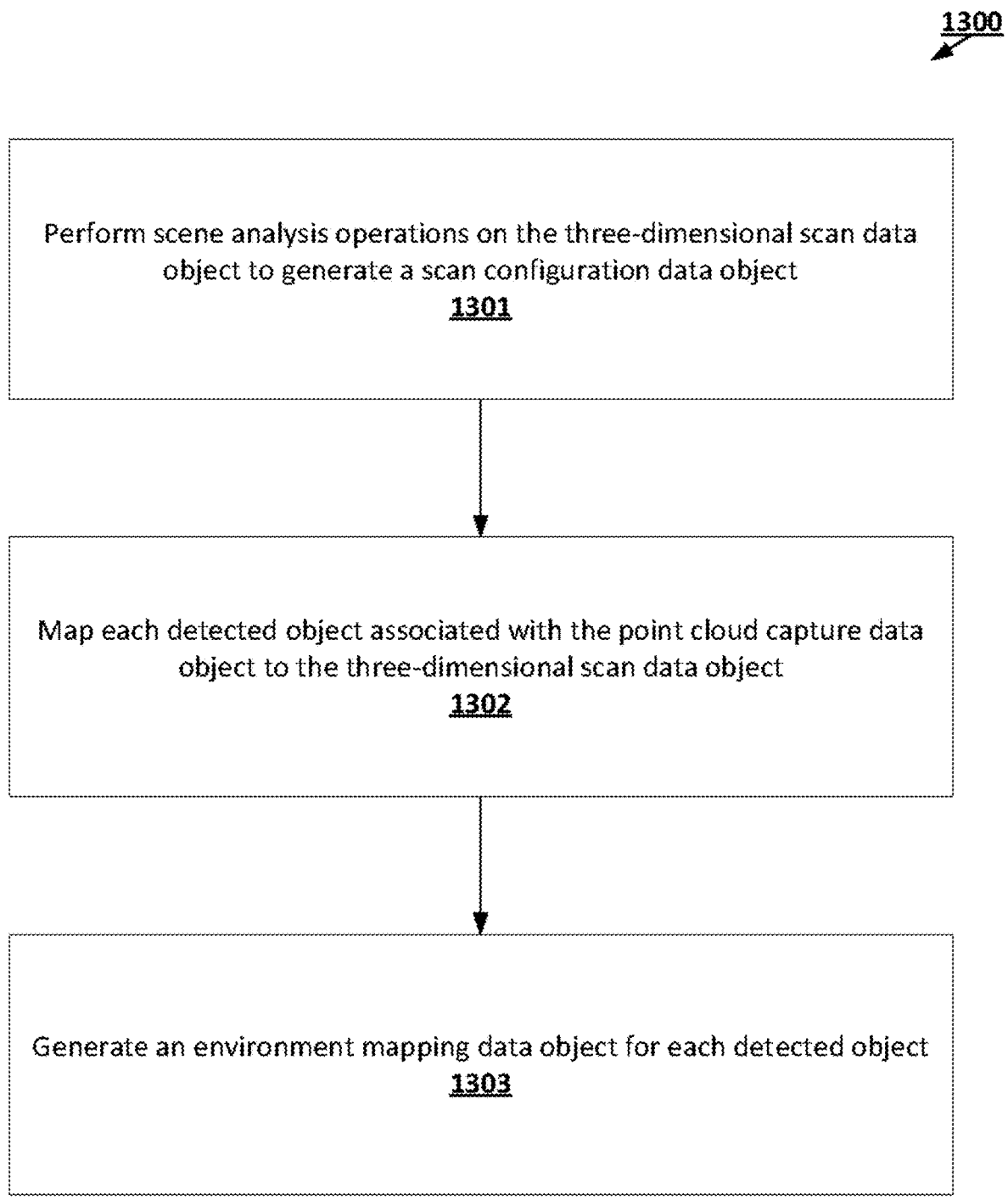
Figure 15:
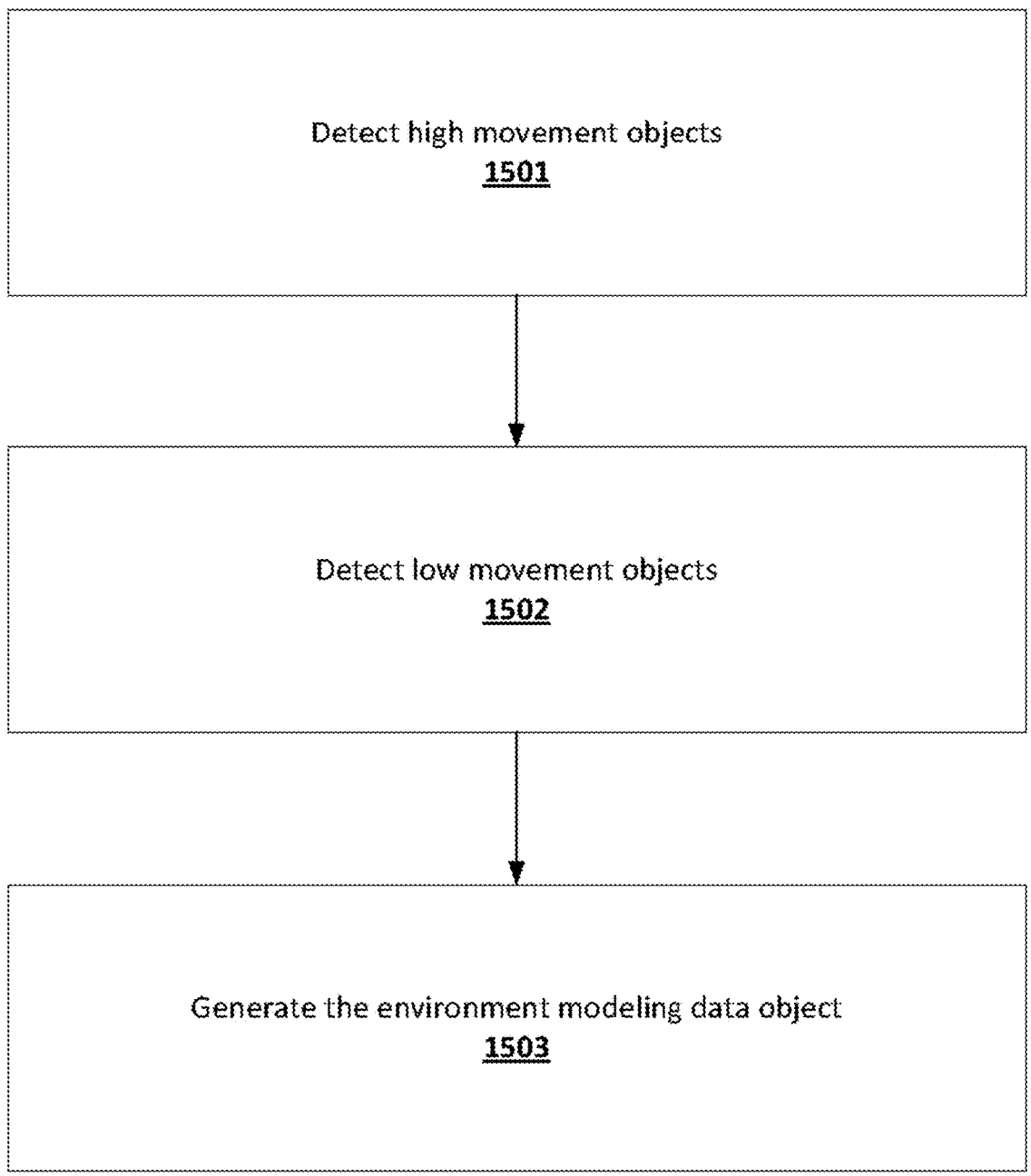

Having thus described the invention in general terms, reference will now be made to the accompanying drawings, which are not necessarily drawn to scale, and wherein:

FIG. 1 provides an exemplary overview of a system that can be used to practice embodiments of the present invention;

FIG. 2 provides an example mixed reality processing computing entity in accordance with some embodiments discussed herein;

FIG. 3 provides an example client computing entity in accordance with some embodiments discussed herein;

FIG. 4 provides a data flow diagram of an example process for performing mixed reality processing in accordance with some embodiments discussed herein;

FIG. 5 provides a flowchart diagram of an example process for transmitting environmental/sensory data about an environment of interest in accordance with some embodiments discussed herein;

FIG. 6 provides a flowchart diagram of an example process for transmitting object-based point cloud partitions in accordance with some embodiments discussed herein;

FIG. 7 provides a flowchart diagram of an example process for transmitting environmental mapping data objects for detected objects of a point cloud capture data object in accordance with some embodiments discussed herein;

FIG. 8 provides a flowchart diagram of an example process for transmitting refined point cloud partitions in accordance with some embodiments discussed herein;

FIG. 9 provides an operational example of an intent determination engine of a mixed reality processing computing entity in accordance with some embodiments discussed herein;

FIG. 10 provides a flowchart diagram of an example process for transmitting a target environment modeling data object in accordance with some embodiments discussed herein;

FIGS. 11A-11D provide operational examples of four mixed reality rendering user interfaces in accordance with some embodiments discussed herein;

FIG. 12 provides a flowchart diagram of an example process for generating object-based point cloud partitions in accordance with some embodiments discussed herein;

FIG. 13 provides a flowchart diagram of an example process for generating environmental mapping data objects for detected objects of a point cloud capture data object in accordance with some embodiments discussed herein;

FIG. 14 provides a flowchart diagram of an example process for generating refined point cloud partitions in accordance with some embodiments discussed herein; and FIG. 15 provides a flowchart diagram of an example process for generating a target environment modeling data object in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to mixed reality processing, one of ordinary skill in the art will recognize that the disclosed concepts can be used to perform other types of data analysis.

I. Overview and Technical Advantages

Various embodiments of the present invention address technical challenges associated with resource requirements of object detection using three-dimensional mixed reality rendering engines. Various existing mixed reality rendering engines utilize unnecessarily complex layers to perform object detection, a feature that causes the noted existing mixed reality rendering engines to require substantial memory and graphical processing unit (GPU) resource requirements in order to store layering data and/or perform complex layering operations. Moreover, various existing mixed reality rendering engines fail to enable effective and efficient segmentation based at least in part on image data, which in turn complicates the use of the noted mixed reality rendering engines to model physical environments in delicate settings, such as in relation to medical applications. Thus, there is a technical need for effective and efficient mixed reality rendering engines that enable accurate segmentations based at least in part on image data.

To address the above-noted challenges associated with efficiency and effectiveness of mixed reality rendering, various embodiments of the present invention disclose solutions that enable accurate segmentation of image data based at least in part on depth data as well as direct object mapping by utilizing geometrically-aware object detection based at least in part on point cloud partitions. By using the noted techniques, various embodiments of the present invention enable direct object mapping in a manner that is configured to both reduce the memory requirements of existing mixed reality rendering engines and GPU requirements of existing mixed reality rendering engines. In this manner, various embodiments of the present invention reduce the resource requirements (e.g., memory resource requirements and/or processing resource requirements) associated with performing mixed reality rendering and make important technical contributions to the field of mixed reality processing.

II. Definitions of Certain Terms

The term "environmental/sensory data" may refer to an electronically-stored data construct that is configured to describe to data objects captured by one or more electronic devices (e.g., one or more mobile devices, one or more augmented reality devices, one or more mixed reality devices, and/or the like) that describe one or more physical phenomena related to an environment of interest, where the environment of interest may include an area of interest in relation to which one or more objects of interest are tracked. For example, environmental/sensory data may describe one or more physical phenomena related to a surgical environment of interest, such as red-green-blue (RGB) data generated by capturing images of the surgical environment of interest, inertial measurement unit data generated by a gyroscope connected to a surgical instrument object of interest in the surgical environment interest and/or an accelerometer connected to the surgical instrument object of interest, infrared phase shift data generated by an infrared sensor capturing infrared streams of the surgical environment of interest, and microphone data recorded based at least in part on audio signals recorded by a microphone that is configured to record vocal utterances of a human agent in the surgical environment of interest. As illustrated above, the environmental/sensory data may be captured by electronic devices, such as electronic devices that each include one or more sensors. For example, in some embodiments, RGB data and infrared phase shift data may be captured by a camera and an infrared sensor respectively, both of which are connected to a pair of smart glasses that are configured to be worn by a human agent (e.g., a surgeon) in the surgical environment of interest, while inertial measurement unit data may be captured by a gyroscope connected to the surgical instrument object of interest and an accelerometer connected to the surgical instrument object of interest, and microphone data may be connected to a microphone device worn by the human agent in the surgical environment of interest.

The term "three-dimensional scan data object" may refer to an electronically-stored data construct that is configured to describe a digital representation of an area of interest in a three-dimensional space. An example of a three-dimensional scan is a three-dimensional scan of a body part area of interest. For example, if the body part area of interest is brain, then the three-dimensional scan data object may describe a three-dimensional magnetic response image (MRI), such as a three-dimensional magnetic response image generated using volumetric three-dimensional imaging. As another example, if the body part area of interest is heart, then the three-dimensional scan data object may describe a three-dimensional heart scan. In some embodiments, the three-dimensional scan data object includes at least one of a Digital Imaging and Communications in Medicine (DICOM) file or a Three-Dimensional Tagged Image File Format (3D-TIFF) file.

The term "point cloud capture data object" may refer to an electronically-stored data construct that is configured to describe recorded data (e.g., recorded location-describing data, recorded color-describing data, and/or the like) associated with a group of recorded points associated with a corresponding environment of interest. In some embodiments, generating the point cloud capture data object for an environment of interest is performed based at least in part on a set of RGB-based features associated with the environment of interest, a set of depth shift series associated with the environment of interest, and the inertial measurement unit data associated with the environment of interest. For example, in some embodiments, to generate a point cloud capture data object associated with an environment of interest, localized static point propagation is performed on the inertial measurement data associated with the environment of interest, and subsequently the output of the localized static point propagation is combined with a set of RGB-based features associated with the environment of interest and a set of depth shift series associated with the environment of interest to generate the point cloud capture data object associated with the environment of interest.

The term "depth-based point cloud partition" may refer to an electronically-stored data construct that is configured to describe a subset of points described by a corresponding point cloud capture data object whose inferred depth values fall within a defined inferred depth value range, where an inferred depth value for a point may be determined based at least in part on a distance between a corresponding location of a point and a tracking location within an environment of interest (e.g., a tracking location that describes the location of the vantage point of an image capturing device within the environment of interest) as described by the infrared phase shift data associated with the environment of interest. For example, in a surgical environment of interest, a SLAM distribution engine may generate a plurality of depth-based point cloud partitions for a point cloud capture data object for the surgical environment of interest based at least in part on inferred distances between the vantage point of an image capturing device in the surgical environment of interest that is configured to be worn by a human agent (e.g., a surgeon) operating within the surgical environment of interest and one or more recorded points detected within the surgical environment of interest, including one or more points that may be deemed to be associated with one or more surgical instrument objects of interest that are present within the surgical environment of interest. Accordingly, after generating a group of depth-based point cloud partitions, each recorded point of a corresponding point cloud capture data object may be associated with a depth-based point cloud partition of the group of depth-based point cloud partitions, where the depth-based point cloud partition may be determined based at least in part on an inferred distance of the particular recorded point from a tracking location within the environment of interest as described by the infrared phase shift data associated with the environment of interest.

The term "object-based point cloud partition" may refer to an electronically-stored data construct that is configured to describe a subset of recorded points associated with a point cloud capture data object that are deemed to be associated with one or more detected/expected objects that are deemed to be physically present within a corresponding environment of interest. For example, an object-based point cloud partition may describe a depth-based point cloud partition that may be deemed to include one or more objects within a corresponding environment of interest, such as an object-based point cloud partition of a point cloud capture data object associated with a surgical environment of interest that is a depth-based point cloud partition for the point cloud capture data object that is deemed to include a surgical instrument object, an object-based point cloud partition of a point cloud capture data object associated with a surgical environment of interest that is a depth-based point cloud partition for the point cloud capture data object that is deemed to include a surgical instrument object and a surgeon hand object, or an object-based point cloud partition of a point cloud capture data object associated with a surgical environment of interest that is a depth-based point cloud partition for the point cloud capture data object that is deemed to include a patient upper body object, and/or the like.

The term "scan configuration data object" may refer to an electronically-stored data construct that is configured to describe one or more parameters determined based at least in part on three-dimensional geometric values of the three-dimensional scan data object. In some embodiments, the scene analysis operations performed on a three-dimensional scan data object in order to generate the scan configuration data object for the three-dimensional scan data object include at least one of the following: (i) mapping anchor points in a corresponding three-dimensional scene to the three-dimensional scan data object in order to generate an anchored three-dimensional scan data object, (ii) generating three-dimensional geometric values for the three-dimensional scene based at least in part on the anchored three-dimensional scan data object, (iii) generating geometrical parameters for the anchored three-dimensional scan data object, and (iv) generating the scan configuration data object based at least in part on the geometrical parameters for the anchored three-dimensional scan data object.

The term "object-scan mapping" may refer to an electronically-stored data construct that is configured to describe a mapping between a three-dimensional region of a corresponding three-dimensional scan data object for a corresponding environment of interest to a corresponding detected object in the corresponding environment as described by a group of object-based point cloud partitions for a point cloud capture data object associated with the corresponding environment of interest. In some embodiments, to generate an object-scan mapping for a corresponding detected object, an environment calibration engine is configured to perform at least one of the following operations: (i) generate a normal orientation for the three-dimensional scan data object (e.g., based at least in part on a predesignated normal orientation for the corresponding three-dimensional scene, such as a predesignated normal to a floor of the corresponding three-dimensional scene), (ii) generate a normal-adjusted orientation for the detected object based at least in part on the object-based point capture partition for the detected object, and (iii) map the corresponding detected object to a three-dimensional region of the three-dimensional scan data object based at least in part on the normal orientation for the three-dimensional scan data object and the normal-adjusted orientation for the detected object.

The term "environment mapping data object" may refer to an electronically-stored data construct that is configured to describe geometric data (e.g., geometric shape data, geometric orientation data, and/or the like) for the detected object, where the geometric data for the detected object may be inferred based at least in part on a scan configuration data object for a three-dimensional scan data object associated with an environment of interest that includes the object of interest. In some embodiments, to generate the environment mapping data object for a detected object, an environment calibration engine: (i) maps the detected object to a three-dimensional region of a three-dimensional scan data object for a corresponding environment of interest using an object-scan mapping for the detected object, (ii) determines one or more environment properties of the three-dimensional region based at least in part on a scan configuration data object for the three-dimensional scan data object, and (iii) determines the environment mapping data object for the detected based object based at least in part on the determined environment properties of the three-dimensional region corresponding to the detected object.

The term "refined point cloud capture data object" may refer to an electronically-stored data construct that is configured to describe a point cloud capture data object that is transformed by performing one or more noise filtering operations, such as one or more Weighted Locally Optimal Projection (WLOP) noise filtering operations. As described above, in some embodiments, depth-based partitioning is performed on the refined point cloud capture data object to generate the plurality of refined point cloud partitions. In some embodiments, to generate a plurality of refined point cloud partitions, a noise filtering engine: (i) performs a fixed number of WLOP operation iterations to generate a refined point cloud capture data object, where each WLOP operation iteration point filtering may be performed by utilizing continual mapping based at least in part on geometric data associated with detected objects as described by the environment mapping data objects for the detected objects, and (ii) after the fixed number of WLOP operation iterations, performs one or more depth-based partitioning operations on the refined point cloud capture data object to generate the plurality of refined point cloud partitions. For example, in some embodiments, the noise filtering engine performs WLOP filtering in a manner configured based at least in part on geometric shapes and/or geometric orientations of a group of detected objects as described by the environment mapping data objects for the detected objects in order to generate the refined point cloud capture data object that may be then used in some embodiments to generate a plurality of refined point cloud partitions.

The term "refined point cloud partition" may refer to an electronically-stored data construct that is configured to describe any subset of the points described by a corresponding refined point cloud capture data object. As described above, in some embodiments, depth-based partitioning is performed on the refined point cloud capture data object to generate the plurality of refined point cloud partitions. In some embodiments, to perform the noted depth-based partitioning operations, a SLAM distribution engine: (i) generates an inferred depth value for each point described by the refined point cloud capture data object based at least in part on the set of depth shift series and/or based at least in part on the infrared phase shift data, and (ii) generates each depth-based point cloud partition as a subset of the points described by the refined point cloud capture data object whose inferred depth values fall within a defined inferred depth value range. For example, in a surgical environment of interest, a SLAM distribution engine may generate a plurality of refined point cloud partitions for a refined point cloud capture data object for the surgical environment of interest based at least in part on inferred distances between the vantage point of an image capturing device in the surgical environment of interest that is configured to be worn by a human agent (e.g., a surgeon) operating within the surgical environment of interest and one or more recorded points detected within the surgical environment of interest, including one or more points that may be deemed to be associated with one or more surgical instrument objects of interest that are present within the surgical environment of interest. Accordingly, after generating a group of refined point cloud partitions, each recorded point of a corresponding refined point cloud capture data object may be associated with a refined point cloud partition of the group of refined point cloud partitions based at least in part on an inferred distance of the particular recorded point from a tracking location within the environment of interest as described by the infrared phase shift data associated with the environment of interest.

The term "high movement object" may refer to an electronically-stored data construct that is configured to describe a detected object within an environment of interest whose movement patterns indicate the threshold-satisfying mobility of the detected object. As described above, to detect a set of high movement objects based at least in part on the plurality of refined point cloud partitions, a computer vision engine may: (i) generate a set of splits based at least in part on the plurality of refined point cloud partitions, where a split may be a segment of a refined point cloud capture data object associated with the plurality of refined point cloud partitions that falls within one or more refined point cloud partitions of the plurality of refined point cloud partitions and is deemed to include an object; (ii) for each split of the set of splits, determine a movement measure relative to a field of view in the corresponding environment of interest (e.g., a field of view of an mixed reality/AR device); and (iii) classify the objects associated with splits whose movement measures satisfy (e.g., fall above or fail to fall below) a movement measure threshold as high movement sets. An example of a high movement object is a surgeon hand and/or a surgical instrument in a surgical environment of interest.

The term "low movement object" may refer to an electronically-stored data construct that is configured to describe a detected object within an environment of interest whose movement patterns indicate the non-threshold-satisfying mobility of the detected object. As described above, to detect a set of low movement objects based at least in part on the plurality of refined point cloud partitions, a computer vision engine may: (i) generate a set of splits based at least in part on the plurality of refined point cloud partitions, where a split may be a segment of a refined point cloud capture data object associated with the plurality of refined point cloud partitions that falls within one or more refined point cloud partitions of the plurality of refined point cloud partitions and is deemed to include an object; (ii) for each split of the set of splits, determines movement measure relative to a field of view in the corresponding environment of interest (e.g., a field of view of an mixed reality/AR device); and (iii) classify objects associated with splits whose movement measures fail to satisfy (e.g., fail to fall above or fall below) a movement measure threshold as low movement objects. An example of a low movement object is a body and/or a body part in a surgical environment of interest.

The term "target environment modeling data object" may refer to an electronically-stored data construct that is configured to describe a visual representation of an environment of interest that is determined based at least in part on performing continual mapping on point cloud partitions associated with a point cloud capture data object for the environment of interest. As described below, a computer vision engine may generate the target environment modeling data object based at least in part on the set of visualization parameters. Examples of visualization parameters include at least one of the following: (i) for each pair of detected objects associated with an environment of interest, a distance visualization parameter that describes a recommended visual distance of the detected objects, (ii) for each detected object associated with an environment of interest, an orientation parameter, (iii) for each detected object associated with an environment of interest, a velocity parameter, and (v) for each detected object associated with an environment of interest, a depth parameter.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (mixed realityAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Framework

FIG. 1 is a schematic diagram of an example system architecture 100 for performing mixed reality processing and generating corresponding mixed reality user interface data (e.g., for providing and/or updating a user interface). The system architecture 100 includes a mixed reality processing system 101 comprising a mixed reality processing computing entity 106 configured to generate mixed reality outputs that can be used to generate mixed reality interfaces. The mixed reality processing system 101 may communicate with one or more client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The system architecture 100 includes a storage subsystem 108 configured to store at least a portion of the data utilized by the mixed reality processing system 101. The mixed reality processing computing entity 106 may be in communication with one or more client computing entities 102. The mixed reality processing computing entity 106 may be configured to receive requests and/or data from client computing entities 102, process the requests and/or data to generate mixed reality outputs (e.g., mixed reality processing data objects), and provide the mixed reality outputs to the client computing entities 102. The client computing entity 102 (e.g., management computing entity) may periodically update/provide raw input data (e.g., data objects describing primary events and/or secondary events) to the mixed reality processing system 101. The client computing entities 102 may further generate user interface data (e.g., one or more data objects) corresponding to the mixed reality outputs and may provide (e.g., transmit, send and/or the like) the user interface data corresponding with the mixed reality outputs for presentation to user computing entities operated by end users.

The storage subsystem 108 may be configured to store at least a portion of the data utilized by the mixed reality processing computing entity 106 to perform mixed reality processing steps/operations and tasks. The storage subsystem 108 may be configured to store at least a portion of operational data and/or operational configuration data including operational instructions and parameters utilized by the mixed reality processing computing entity 106 to perform mixed reality processing steps/operations in response to requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, mixed realityAM, RRAM, SONOS, FJG RAM, Millipede memory, racetrack memory, and/or the like.

Exemplary Mixed Reality Processing Computing Entity

FIG. 2 provides a schematic of a mixed reality processing computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the mixed reality processing computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the mixed reality processing computing entity 106 may include or be in communication with a processing element 205 (also referred to as processors, processing circuitry, and/or similar terms used herein interchangeably) that communicate with other elements within the mixed reality processing computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the mixed reality processing computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, mixed realityAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the mixed reality processing computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the mixed reality processing computing entity 106 with the assistance of the processing element 205 and operating system.

As indicated, in one embodiment, the mixed reality processing computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the mixed reality processing computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the mixed reality processing computing entity 106 may include or be in communication with one or more input elements, such as a keyboard input, a mouse input, a touch screen/display input, motion input, movement input, audio input, pointing device input, joystick input, keypad input, and/or the like. The mixed reality processing computing entity 106 may also include or be in communication with one or more output elements (not shown), such as audio output, video output, screen/display output, motion output, movement output, and/or the like.

Exemplary Client Computing Entity

FIG. 3 provides an illustrative schematic representative of an client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the mixed reality processing computing entity 106.

In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the mixed reality processing computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the mixed reality processing computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, mixed realityAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the mixed reality processing computing entity 106 and/or various other computing entities.

In another embodiment, the client computing entity 102 may include one or more components or functionality that are the same or similar to those of the mixed reality processing computing entity 106, as described in greater detail above. As will be recognized, these frameworks and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

To address the above challenges associated with efficiency and effectiveness of mixed reality rendering, various embodiments of the present invention disclose solutions that enable accurate segmentation of image data based at least in part on depth data as well as direct object mapping by utilizing geometrically-aware object detection based at least in part on point cloud partitions. By using the noted techniques, various embodiments of the present invention enable direct object mapping in a manner that is configured to both reduce the memory requirements of existing mixed reality rendering engines and GPU requirements of existing mixed reality rendering engines. In this manner, various embodiments of the present invention reduce the resource requirements (e.g., memory resource requirements and/or processing resource requirements) associated with performing mixed reality rendering and make important technical contributions to the field of mixed reality processing.

Exemplary Framework for Object Tracking in an Environment of Interest

FIG. 4 is a data flow diagram of an example process 400 for performing object tracking using the mixed reality processing computing entity 106. Via the various steps/operations of the process 400, the mixed reality processing computing entity 106 can efficiently and effectively track multiple objects (e.g., including an invasive object) in a complex physical environment based at least in part on end user intent expression data associated with an end user of the mixed reality processing computing entity 106 who is present in the complex physical environment.

As depicted in FIG. 4, the process 400 begins at step/operation 401 when an environmental/sensory data generation unit 421 of the mixed reality processing computing entity 106 generates environmental/sensory data about an environment of interest and provides the environmental/sensory data to a bridge bus engine 422 of the mixed reality processing computing entity 106. In some embodiments, the environmental/sensory data include at least one of: RGB data generated by a camera that captures images of the environment of interest, inertial measurement unit data generated by at least one of a gyroscope connected to an object of interest in the environment of interest or an accelerometer connected to the object of interest, infrared phase shift data generated by an infrared sensor capturing infrared streams of the environment of interest, and microphone data recorded based at least in part on audio signals recorded in the environment of interest.

In general, the environmental/sensory data may refer to data objects captured by one or more electronic devices (e.g., one or more mobile devices, one or more augmented reality (AR) devices, one or more mixed reality (MR) devices, and/or the like) that describe one or more physical phenomena related to an environment of interest, where the environment of interest may include an area of interest in relation to which one or more objects of interest are tracked. For example, environmental/sensory data may describe one or more physical phenomena related to a surgical environment of interest, such as RGB data generated by capturing images of the surgical environment of interest, inertial measurement unit data generated by a gyroscope connected to a surgical instrument object of interest in the surgical environment interest and/or an accelerometer connected to the surgical instrument object of interest, infrared phase shift data generated by an infrared sensor capturing infrared streams of the surgical environment of interest, and microphone data recorded based at least in part on audio signals recorded by a microphone that is configured to record vocal utterances of a human agent in the surgical environment of interest. As illustrated above, the environmental/sensory data may be captured by electronic devices, such as electronic devices that each include one or more sensors. For example, in some embodiments, RGB data and infrared phase shift data may be captured by a camera and an infrared sensor respectively, both of which may in some embodiments be connected to a pair of smart glasses that are configured to be worn by a human agent (e.g., a surgeon) in the surgical environment of interest, while inertial measurement unit data may be captured by a gyroscope connected to the surgical instrument object of interest and an accelerometer connected to the surgical instrument object of interest, and microphone data may be connected to a microphone device worn by the human agent in the surgical environment of interest.

In some embodiments, step/operation 401 may be performed in accordance with the process that is depicted in FIG. 5. The process that is depicted in FIG. 5 begins at step/operation 501 when the environmental/sensory data generation unit 421 obtains RGB data from one or more cameras. In some embodiments, the one or more cameras are configured to provide RGB color matrices to the environmental/sensory data generation unit 421. In some embodiments, each RGB color matrix value may be characterized by a red value in the range 0-255, a green value in the range 0-225, and a blue value in the range 0-225.

At step/operation 502, the environmental/sensory data generation unit 421 obtains inertial measurement unit data. The inertial measurement unit data may include a gyroscope stream generated by a gyroscope and an accelerometer stream generated by an accelerometer. In some embodiments, the gyroscope records and reports rotation rates along three axes. In some embodiments, the accelerometer records and reports velocity rates along three axes.

At step/operation 503, the environmental/sensory data generation unit 421 generates infrared phase shift data. In some embodiments, to generate the infrared phase shift data, the environmental/sensory data generation unit 421 obtains a modulation stream and a reflection stream from an infrared sensor, and then computes a phase shift measurement based at least in part on the modulation stream and the reflection stream. In some embodiments, the infrared sensor is configured to send a modulation stream and in response receive a reflection stream.

At step/operation 504, the environmental/sensory data generation unit 421 obtains microphone data from a microphone. In some embodiments, the environmental/sensory data generation unit 421 obtains the microphone data as an audio stream. In some embodiments, the microphone is configured to stream audio data along a mono channel.

At step/operation 505, the environmental/sensory data generation unit 421 transmits at least one of the RGB data, the inertial measurement data, the infrared phase shift data, and the microphone data to the bridge bus engine 422. In some embodiments, the environmental/sensory data generation unit 421 transmits the RGB data, the inertial measurement unit data, and the infrared phase shift data to the bridge bus engine 422. In some embodiments, the environmental/sensory data generation unit 421 transmits the inertial measurement unit data and the infrared phase shift data to the intent determination engine 427 of the mixed reality processing computing entity 106. In some embodiments, the environmental/sensory data generation unit 421 transmits the microphone data to the intent determination engine 427.

Returning to FIG. 4, at step/operation 402, the bridge bus engine 422 forwards the RGB data, the inertial measurement data, and the infrared phase shift data obtained from the environmental/sensory data generation unit 421 to a simultaneous localization and mapping (SLAM) distribution engine 423 of the mixed reality processing computing entity 106. Moreover, at step/operation 403, the bridge bus engine 422 obtains a three-dimensional scan data object of an area of interest in the environment of interest and provides the three-dimensional scan data object to an environment calibration engine 424 of the mixed reality processing computing entity 106. A three-dimensional scan data object may describe a digital representation of an area of interest in a three-dimensional space. An example of a three-dimensional scan is a three-dimensional scan of a body part area of interest. For example, if the body part area of interest is brain, then the three-dimensional scan data object may describe a three-dimensional magnetic response image (MRI), such as a three-dimensional magnetic response image generated using volumetric three-dimensional imaging. As another example, if the body part area of interest is heart, then the three-dimensional scan data object may describe a three-dimensional heart scan. In some embodiments, the three-dimensional scan data object includes at least one of a Digital Imaging and Communications in Medicine (DICOM) file or a Three-Dimensional Tagged Image File Format (3D-TIFF) file.

Returning to FIG. 4, at step/operation 404, the SLAM distribution engine 423 generates a plurality of object-based point cloud partitions for a point cloud capture data object associated with the area of interest and provides the plurality of object-based point cloud partitions to the environment calibration engine 424. In some embodiments, the SLAM distribution engine 423 first generates the point cloud capture data object based at least in part on the RGB data, the inertial measurement data, and the infrared phase shift data obtained from the environmental/sensory data generation unit 421, and then performs phase-shift layering on the point cloud capture data object based at least in part on the phase shift data obtained from the environmental/sensory data generation unit 421 to generate the plurality of object-based point cloud partitions.

In some embodiments, step/operation 404 may be performed in accordance with the process that is depicted in FIG. 6. The process that is depicted in FIG. 6 begins at step/operation 601 when the SLAM distribution engine 423 generates a set of RGB-based features based at least in part on the RGB data obtained from the environmental/sensory data generation unit 421. In some embodiments, the SLAM distribution engine 423 performs image processing on the RGB data obtained from the environmental/sensory data generation unit 421 to generate the set of RGB-based features.

At step/operation 602, the SLAM distribution engine 423 generates a set of depth shift series based at least in part on the infrared phase shift data obtained from the environmental/sensory data generation unit 421. In some embodiments, the SLAM distribution engine 423 performs localization on the infrared phase shift data to generate a set of localized shift series, and subsequently generates the set of depth shift series based at least in part on the set of localized shift series.

At step/operation 603, the SLAM distribution engine 423 generates a point cloud capture data object associated with the area of interest based at least in part on the set of RGB-based features, the set of depth shift series, and the inertial measurement unit data obtained from the environmental/sensory data generation unit 421. A point cloud capture data object may describe recorded data (e.g., recorded location-describing data, recorded color-describing data, and/or the like) associated with a group of recorded points associated with a corresponding environment of interest. In some embodiments, generating the point cloud capture data object for an environment of interest is performed based at least in part on a set of RGB-based features associated with the environment of interest, a set of depth shift series associated with the environment of interest, and the inertial measurement unit data associated with the environment of interest. For example, in some embodiments, to generate a point cloud capture data object associated with an environment of interest, localized static point propagation is performed on the inertial measurement data associated with the environment of interest, and subsequently the output of the localized static point propagation is combined with a set of RGB-based features associated with the environment of interest and a set of depth shift series associated with the environment of interest to generate the point cloud capture data object associated with the corresponding environment of interest.

At step/operation 604, the SLAM distribution engine 423 generates a plurality of plurality of depth-based point cloud partitions for the point cloud capture data object based at least in part on the set of depth shift series and/or based at least in part on the infrared phase shift data. In some embodiments, to generate the plurality of depth-based point cloud partitions, the SLAM distribution engine 423: (i) generates an inferred depth value for each point described by the point cloud capture data object based at least in part on the set of depth shift series and/or based at least in part on the infrared phase shift data, and (ii) generates each depth-based point cloud partition as a subset of the points described by the point cloud capture data object whose inferred depth values falls within a defined inferred depth value range.

In general, a depth-based point cloud partition may describe a subset of points described by a corresponding point cloud capture data object whose inferred depth values fall within a defined inferred depth value range, where an inferred depth value for a point may be determined based at least in part on a distance between a corresponding location of a point and a tracking location within an environment of interest (e.g., a tracking location that describes the location of the vantage point of an image capturing device within the environment of interest) as described by the infrared phase shift data associated with the environment of interest. For example, in a surgical environment of interest, a SLAM distribution engine 423 may generate a plurality of depth-based point cloud partitions for a point cloud capture data object for the surgical environment of interest based at least in part on inferred distances between the vantage point of an image capturing device in the surgical environment of interest that is configured to be worn by a human agent (e.g., a surgeon) operating within the surgical environment of interest and one or more recorded points detected within the surgical environment of interest, including one or more points that may be deemed to be associated with one or more surgical instrument objects of interest that are present within the surgical environment of interest. Accordingly, after generating a group of depth-based point cloud partitions, each recorded point of a corresponding point cloud capture data object may be associated with a depth-based point cloud partition of the group of depth-based point cloud partitions, where the depth-based point cloud partition may be determined based at least in part on an inferred distance of the particular recorded point from a tracking location within the environment of interest as described by the infrared phase shift data associated with the environment of interest.

At step/operation 605, the SLAM distribution engine 423 generates the plurality of object-based point cloud partitions for the point cloud capture data object based at least in part on the plurality of depth-based point cloud partitions for the point cloud capture data object. In some embodiments, to generate the plurality of object-based point cloud partitions, the SLAM distribution engine 423 detects any object outer linings within each depth-based point cloud partition to generate a whole plane distribution based at least in part on object movement patterns as described by the RGB-based features associated with the corresponding environment of interest and object depth patterns as described by the set of depth shift series for the corresponding environment of interest.

In general, an object-based point cloud partition may describe a subset of recorded points associated with a point cloud capture data object that are deemed to be associated with one or more detected/expected objects that are deemed to be physically present within a corresponding environment of interest. For example, an object-based point cloud partition may describe a depth-based point cloud partition that may be deemed to include one or more objects within a corresponding environment of interest, such as an object-based point cloud partition of a point cloud capture data object associated with a surgical environment of interest that is a depth-based point cloud partition for the point cloud capture data object that is deemed to include a surgical instrument object, an object-based point cloud partition of a point cloud capture data object associated with a surgical environment of interest that is a depth-based point cloud partition for the point cloud capture data object that is deemed to include a surgical instrument object and a surgeon hand object, or an object-based point cloud partition of a point cloud capture data object associated with a surgical environment of interest that is a depth-based point cloud partition for the point cloud capture data object that is deemed to include a patient upper body object, and/or the like.

At step/operation 606, the SLAM distribution engine 423 provides the plurality of object-based point cloud partitions for the point cloud capture data object to the environment calibration engine 424. As described below, the environment calibration engine 424 may be configured to process the plurality of object-based point cloud partitions to generate an environmental mapping data object for each detected object associated with the point cloud capture data object as described by the plurality of object-based point cloud partitions.

Returning to FIG. 4, at step/operation 405, the environment calibration engine 424: (i) processes the plurality of object-based point cloud partitions for the point cloud capture data object associated with the environment of interest in accordance with the three-dimensional scan data object for the corresponding environment of interest to generate, for each detected object associated with the point cloud capture data object as described by the plurality of object-based point cloud partitions, an environmental mapping data object, and (ii) provides each environment mapping data object for a detected object to a noise filtering engine 425 of the mixed reality processing computing entity 106. In some embodiments, the environment calibration engine 424 processes the plurality of object-based point cloud partitions for the point cloud capture data object associated with the environment of interest in accordance with the three-dimensional scan data object for the corresponding environment of interest to generate a pose estimation determination for an area of interest (e.g., a body part area of interest) and/or for an object of interest (e.g., a surgical instrument object of interest) in relation to at least one of the point cloud capture data object for the corresponding environment of interest and the three-dimensional scan data object for the corresponding environment of interest.

In some embodiments, the environment calibration engine 424: (i) processes the plurality of object-based point cloud partitions for the point cloud capture data object to generate: (a) a pose estimation determination for an area of interest within a corresponding environment of interest in relation to both the point cloud capture data object for the corresponding environment of interest and the three-dimensional scan data object for the corresponding environment of interest, and (b) a cloud-scan mapping of each detected object described by the point cloud capture data object for the corresponding environment of interest to a three-dimensional region of the three-dimensional scan data object for the corresponding environment of interest, and (ii) provides the pose estimation determination and the cloud-scan mapping to a noise filtering engine 425 of the mixed reality processing computing entity 106.

In some embodiments, step/operation 405 may be performed in accordance with the process that is depicted in FIG. 7. The process that is depicted in FIG. 7 begins at step/operation 701 when the environment calibration engine 424 performs one or more scene analysis operations on the three-dimensional scan data object for the corresponding environment of interest to generate a scan configuration data object for the three-dimensional scan data object. The scan configuration data object may describe one or more parameters determined based at least in part on three-dimensional geometric values of the three-dimensional scan data object. In some embodiments, the scene analysis operations performed on a three-dimensional scan data object in order to generate the scan configuration data object for the three-dimensional scan data object include at least one of the following: (i) mapping anchor points in a corresponding three-dimensional scene to the three-dimensional scan data object in order to generate an anchored three-dimensional scan data object, (ii) generating three-dimensional geometric values for the three-dimensional scene based at least in part on the anchored three-dimensional scan data object, (iii) generating geometrical parameters for the anchored three-dimensional scan data object, and (iv) generating the scan configuration data object based at least in part on the geometrical parameters for the anchored three-dimensional scan data object.

At step/operation 702, the environment calibration engine 424 maps each detected object associated with the point cloud capture data object as described by the plurality of object-based point cloud partitions to the three-dimensional scan data object based at least in part on the scan configuration data object for the three-dimensional scan data object to generate a group of object-scan mappings. As described above, the plurality of object-based point cloud partitions may describe a group of detected objects mapped to a group of depth-based point cloud partitions of the point cloud capture data object. In some embodiments, at step/operation 702, the environment calibration engine 424 maps each such detected object to a three-dimensional region of the three-dimensional scan data object.

In general, an object-scan mapping may describe mapping a three-dimensional region of a corresponding three-dimensional scan data object for a corresponding environment of interest to a corresponding detected object in the corresponding environment as described by a group of object-based point cloud partitions for a point cloud capture data object associated with the corresponding environment of interest. In some embodiments, to generate an object-scan mapping for a corresponding detected object, the environment calibration engine 424 is configured to perform at least one of the following operations: (i) generate a normal orientation for the three-dimensional scan data object (e.g., based at least in part on a predesignated normal orientation for the corresponding three-dimensional scene, such as a predesignated normal to a floor of the corresponding three-dimensional scene), (ii) generate a normal-adjusted orientation for the detected object based at least in part on the object-based point capture partition for the detected object, and (iii) map the corresponding detected object to a three-dimensional region of the three-dimensional scan data object based at least in part on the normal orientation for the three-dimensional scan data object and the normal-adjusted orientation for the detected object.

At step/operation 703, the environment calibration engine 424 generates, for each detected object associated with the point cloud capture data object as described by the plurality of object-based point cloud partitions, the environment mapping data object for the detected object based at least in part on the object-scan mapping for the detected object. The environment mapping data object for a detected object may describe geometric data (e.g., geometric shape data, geometric orientation data, and/or the like) for the detected object, where the geometric data for the detected object may be inferred based at least in part on a scan configuration data object for a three-dimensional scan data object associated with an environment of interest that includes the object of interest. In some embodiments, to generate the environment mapping data object for a detected object, an environment calibration engine 424: (i) maps the detected object to a three-dimensional region of a three-dimensional scan data object for a corresponding environment of interest using an object-scan mapping for the detected object, (ii) determines one or more environment properties of the three-dimensional region based at least in part on a scan configuration data object for the three-dimensional scan data object, and (iii) determines the environment mapping data object for the detected based object based at least in part on the determined environment (e.g., geometric) properties of the three-dimensional region corresponding to the detected object.

At step/operation 704, the environment calibration engine 424 provides each environment mapping data object for a detected object to the noise filtering engine 425. As described below, the noise filtering engine 425 may be configured to process a plurality of object-based point cloud partitions for a point cloud capture data object of an environment of interest based at least in part on the environment mapping data objects for the group of detected objects described by the plurality of object-based point cloud partitions in order to generate a plurality of refined point cloud partitions for the point cloud capture data object.

Returning to FIG. 4, at step/operation 406, the noise filtering engine 425: (i) processes the plurality of object-based point cloud partitions based at least in part on the environment mapping data objects for the group of detected objects described by the plurality of object-based point cloud partitions in order to generate a plurality of refined point cloud partitions for the corresponding point cloud capture data object, and (ii) provides the plurality of refined point cloud partitions to a computer vision engine 426 of the mixed reality processing computing entity 106. In some embodiments, the noise filtering engine 425 is configured to perform one or more point cloud noise filtering operations, such as one or more Weighted Locally Optimal Projection (WLOP) noise filtering operations. While various embodiments of the present invention disclose using WLOP noise filtering operations, a person of ordinary skill in the relevant technology will recognize that other point cloud noise filtering techniques may also be utilized.

In some embodiments, step/operation 406 may be performed in accordance with the process that is depicted in FIG. 8. The process that is depicted in FIG. 8 begins at step/operation 801 when the noise filtering engine 425 identifies the plurality of object-based point cloud partitions. In some embodiments, the noise filtering engine 425 generates an object-based point cloud partition data entity of a plurality of object-based point cloud partition data entities based at least in part on each object-based point cloud partition of the plurality of object-based point cloud partitions.

At step/operation 802, the noise filtering engine 425 performs one or more preprocessing operations on each object-based point cloud partition of the plurality of object-based point cloud partitions in accordance with a required WLOP output to generate a preprocessed object-based point cloud partition of a plurality of preprocessed object-based point cloud partitions. In some embodiments, to generate a preprocessed object-based point cloud partition, the corresponding object-based point cloud partition is transformed to have a structure/format of an expected output of a WLOP model for the corresponding point cloud partition that includes the corresponding object-based point cloud partition.

At step/operation 803, the noise filtering engine 425 performs one or more WLOP filtering operations on the plurality of preprocessed object-based point cloud partitions in accordance with the environment mapping data objects for the group of detected objects described by the corresponding object-based point cloud partitions in order to generate the plurality of refined point cloud partitions. In some embodiments, to perform step/operation 803, the noise filtering engine 425: (i) performs a fixed number (e.g., a predefined number) of WLOP operation iterations to generate a refined point cloud capture data object, where each WLOP operation iteration point filtering is performed based at least in part on geometric data associated with detected objects as described by the environment mapping data objects for the detected objects, and (ii) after the fixed number of WLOP operation iterations, performs one or more depth-based partitioning operations (e.g., as described above with reference to step/operation 604 of the process that is depicted in FIG. 6) on the refined point cloud capture data object to generate the plurality of refined point cloud partitions.

A refined point cloud capture data object may be a point cloud capture data object that is transformed by performing one or more noise filtering operations, such as one or more WLOP noise filtering operations. As described above, in some embodiments, depth-based partitioning is performed on the refined point cloud capture data object to generate the plurality of refined point cloud partitions. In some embodiments, to generate a plurality of refined point cloud partitions, the noise filtering engine 425: (i) performs a fixed number of WLOP operation iterations to generate a refined point cloud capture data object, where each WLOP operation iteration point filtering may be performed by utilizing continual mapping based at least in part on geometric data associated with detected objects as described by the environment mapping data objects for the detected objects, and (ii) after the fixed number of WLOP operation iterations, performs one or more depth-based partitioning operations on the refined point cloud capture data object to generate the plurality of refined point cloud partitions. For example, in some embodiments, the noise filtering engine 425 performs WLOP filtering in a manner configured based at least in part on geometric shapes and/or geometric orientations of a group of detected objects as described by the environment mapping data objects for the detected objects in order to generate the refined point cloud capture data object that may be then used in some embodiments to generate a plurality of refined point cloud partitions.

A refined point cloud partition may be any subset of the points described by a corresponding refined point cloud capture data object. As described above, in some embodiments, depth-based partitioning is performed on the refined point cloud capture data object to generate the plurality of refined point cloud partitions. In some embodiments, to perform the noted depth-based partitioning operations, the SLAM distribution engine 423: (i) generates an inferred depth value for each point described by the refined point cloud capture data object based at least in part on the set of depth shift series and/or based at least in part on the infrared phase shift data, and (ii) generates each depth-based point cloud partition as a subset of the points described by the refined point cloud capture data object whose inferred depth values fall within a defined inferred depth value range. For example, in a surgical environment of interest, a SLAM distribution engine 423 may generate a plurality of refined point cloud partitions for a refined point cloud capture data object for the surgical environment of interest based at least in part on inferred distances between the vantage point of an image capturing device in the surgical environment of interest that is configured to be worn by a human agent (e.g., a surgeon) operating within the surgical environment of interest and one or more recorded points detected within the surgical environment of interest, including one or more points that may be deemed to be associated with one or more surgical instrument objects of interest that are present within the surgical environment of interest. Accordingly, after generating a group of refined point cloud partitions, each recorded point of a corresponding refined point cloud capture data object may be associated with a refined point cloud partition of the group of refined point cloud partitions based at least in part on an inferred distance of the particular recorded point from a tracking location within the environment of interest as described by the infrared phase shift data associated with the environment of interest.

At step/operation 804, the noise filtering engine 425 provides the plurality of refined point cloud partitions to the computer vision engine 426. As described below, the computer vision engine 426 may generate a target scene modeling output based at least in part on the plurality of refined point cloud partitions.

Returning to FIG. 4, at step/operation 407, the intent determination engine 427 receives end user monitoring data to generate an intent determination data object and provides the intent determination data object to both the computer vision engine 426 and the carrier engine 428 of the mixed reality processing computing entity 106. The intent determination data object may describe a determination about an intention of the end user that may be determined based at end user monitoring data associated with the end user, such as based at least in part on voice-based commands uttered by the end user, text-based commands uttered by the end user, gesture-based commands uttered by the end user, eye movements of the end user. In some embodiments, the intent determination engine 427 is configured to process the noted end user monitoring data to infer an intent determination an provide the intent determination to both the computer vision engine 426 and the carrier engine 428.

An operational example of an intent determination engine 427 is depicted in FIG. 9. As depicted in FIG. 9, the intent determination engine 427 includes a natural language processing engine 901, a gesture controller engine 902, an eye tracking engine 903, and an intent aggregation engine 904. The natural language processing engine 901 may be configured to process audio data associated with an environment of interest to determine an audio-based intent determination data object. The gesture controller engine 902 may be configured to process (e.g., using a convolutional neural network machine learning model) RGB spectrum input associated with a human agent in an environment of interest to determine a gesture-based intent determination data object. The eye tracking engine 903 may be configured to process eye tracking monitoring data (e.g., recorded by an inward facing camera installed on an electronic device worn by a human agent) to determine an eye-tracking-based intent determination data object describing an inferred object/direction/target of eye tracking focus for a human agent in the environment of interest. The intent aggregation engine 904 may be configured to aggregate the audio-based intent determination data object, the gesture-based intent determination data object, and the eye-tracking-based intent determination data object to generate the intent determination data object.

Returning to FIG. 4, at step/operation 408, the computer vision engine 426 generates a target environment modeling data object based at least in part on the plurality of refined point cloud partitions, and provides the environment modeling data object to the carrier engine 428. In some embodiments, to generate the environment modeling data object, the computer vision engine 426: (i) processes the plurality of refined point cloud partitions to detect a set of objects including a set of high movement objects and a set of low movement objects, and (ii) generates the environment modeling data object based at least in part on distance parameters associated with objects pairs from the set of objects, orientation parameters for the set of objects, velocity parameters of set of high movement objects, and a target area of interest in the environment of interest.

In some embodiments, step/operation 408 is performed in accordance with the process that is depicted in FIG. 10. The process that is depicted in FIG. 10 begins at step/operation 1001 when the computer vision engine 426 detects a set of high movement objects and/or a set of low movement objects based at least in part on the plurality of refined point cloud partitions. In some embodiments, to detect the set of high movement objects and/or the set of low movement objects based at least in part on the plurality of refined point cloud partitions, the computer vision engine 426: (i) generates a set of splits based at least in part on the plurality of refined point cloud partitions, where a split may be a segment of a refined point cloud capture data object associated with the plurality of refined point cloud partitions that falls within one or more refined point cloud partitions of the plurality of refined point cloud partitions and is deemed to include an object; (ii) for each split of the set of splits, determines a movement measure relative to a field of view in the corresponding environment of interest (e.g., a field of view of an mixed reality/AR device); (iii) classifies the objects associated with splits whose movement measures satisfy (e.g., fall above or fail to fall below) a movement measure threshold as high movement sets, and (iv) classifies objects associated with splits whose movement measures fail to satisfy (e.g., fail to fall above or fall below) a movement measure threshold as low movement objects.

In general, a high movement object may describe a detected object within an environment of interest whose movement patterns indicate the threshold-satisfying mobility of the detected object. As described above, to detect a set of high movement objects based at least in part on the plurality of refined point cloud partitions, the computer vision engine 426 may: (i) generate a set of splits based at least in part on the plurality of refined point cloud partitions, where a split may be a segment of a refined point cloud capture data object associated with the plurality of refined point cloud partitions that falls within one or more refined point cloud partitions of the plurality of refined point cloud partitions and is deemed to include an object; (ii) for each split of the set of splits, determine a movement measure relative to a field of view in the corresponding environment of interest (e.g., a field of view of an mixed reality/AR device); and (iii) classify the objects associated with splits whose movement measures satisfy (e.g., fall above or fail to fall below) a movement measure threshold as high movement sets. An example of a high movement object is a surgeon hand and/or a surgical instrument in a surgical environment of interest.

Moreover, a low movement object may describe a detected object within an environment of interest whose movement patterns indicate the non-threshold-satisfying mobility of the detected object. As described above, to detect a set of low movement objects based at least in part on the plurality of refined point cloud partitions, the computer vision engine 426 may: (i) generate a set of splits based at least in part on the plurality of refined point cloud partitions, where a split may be a segment of a refined point cloud capture data object associated with the plurality of refined point cloud partitions that falls within one or more refined point cloud partitions of the plurality of refined point cloud partitions and is deemed to include an object; (ii) for each split of the set of splits, determines movement measure relative to a field of view in the corresponding environment of interest (e.g., a field of view of an mixed reality/AR device); and (iii) classify objects associated with splits whose movement measures fail to satisfy (e.g., fail to fall above or fall below) a movement measure threshold as low movement objects. An example of a low movement object is a body and/or a body part in a surgical environment of interest.

In some embodiments, to detect an object based at least in part on the plurality of refined point cloud partitions, the computer vision engine 426: (i) generates a continual mapping data object for a corresponding refined point cloud capture associated with the plurality of refined point cloud partitions based at least in part on the corresponding refined point cloud capture, (ii) processes the continual mapping using a required number of outline matching iterations, where during each outline matching iteration the computer vision engine 426 adjusts an existing continual mapping data object provided as an input to the outline matching iteration by: (a) performing object outline detection on the existing continual mapping data object based at least in part on the environment mapping data objects for the group of detected objects associated with the plurality of refined point cloud partitions in order to detect a set of inferred object outlines in the existing continual mapping data object, and (b) adding the set of inferred object outlines to the existing continual mapping data object to generate an updated continual mapping data object which is an output of the outline matching iteration. In some embodiments, performing the required number of outline matching iterations includes performing successive outline matching iterations until an outline matching iteration that results in a continual mapping data object whose set of inferred object outlines have an outline matching similarity measure in relation to the one or more geometric properties of the detected objects described by the environment mapping data objects that satisfies (e.g., falls above) an outline matching similarity measure threshold.

As discussed above, an operational example of a high movement object may be a hand. In some embodiments, to detect a hand based at least in part on the plurality of refined point cloud partitions, the computer vision engine 426: (i) generates a continual mapping data object for a corresponding refined point cloud capture associated with the plurality of refined point cloud partitions, (ii) generates a mask for the hand in the corresponding refined point cloud capture based at least in part on the continual mapping data object, (iii) updates the continual mapping data object by using the mask to separate the hand from surrounding objects (e.g., from an arm) in the continual mapping data object, (iv) maps the mask to a detected hand object in the three-dimensional scan data object, (iv) generates a three-dimensional visual representation of the hand based at least in part on the mask and/or based at least in part on the environment mapping data object for the hand, and (v) updates the three-dimensional visual representation based at least in part on any inertial measurement unit data and/or depth data (e.g., infrared sensor data) associated with the hand.

As discussed above, an operational example of a low movement object may be a body. In some embodiments, to detect a body, the computer vision engine 426: (i) generates a continual mapping data object for a corresponding refined point cloud capture associated with the plurality of refined point cloud partitions, (ii) performs one or more convolutional operations across the continual mapping data object to detect one or more separating points for the body in the corresponding refined point cloud partition, (iii) generates a continual separation data object (e.g., a continual separation matrix) for the body based at least in part on the one or more separating points, (iv) identifies a body part of interest based at least in part on the intent determination data object provided to the computer vision engine 426 by the intent determination engine 427, (v) determines a body part orientation and a body part size for the body part of interest based at least in part on an environment mapping data object for the body part of interest, and (vi) generates a three-dimensional visual representation of the body part of interest based at least in part on the continual separation data object, the body part orientation, and the body part size.

At step/operation 1002, the computer vision engine 426 generates the target environment modeling data object based at least in part on the high movement objects and the low movement objects. In some embodiments, to generate the target environment modeling data object, the computer vision engine 426 first generates a set of visualization parameters for the set of high movement objects and the set of low movement objects. Examples of visualization parameters include at least one of the following: (i) for each pair of detected objects, a distance visualization parameter that describes a recommended visual distance of the detected objects, (ii) for each detected object, an orientation parameter, (iii) for each detected object, a velocity parameter, and (v) for each detected object, a depth parameter. The computer vision engine 426 may then generate the target environment modeling data object based at least in part on the set of visualization parameters.

In general, a target environment modeling data object may describe a visual representation of an environment of interest that is determined based at least in part on performing continual mapping on point cloud partitions associated with a point cloud capture data object for the environment of interest. As described above, the computer vision engine 426 may generate the target environment modeling data object based at least in part on the set of visualization parameters. Examples of visualization parameters include at least one of the following: (i) for each pair of detected objects associated with an environment of interest, a distance visualization parameter that describes a recommended visual distance of the detected objects, (ii) for each detected object associated with an environment of interest, an orientation parameter, (iii) for each detected object associated with an environment of interest, a velocity parameter, and (v) for each detected object associated with an environment of interest, a depth parameter.

At step/operation 1003, the computer vision engine 426 provides the environment modeling data object to the carrier engine 428. As described below, the carrier engine 428 may be configured to process the environment modeling data object and the intention indication data object received from the intent determination engine 427 to generate a three-dimensional rendering input that may then be processed by the three-dimensional rendering engine 429 of the mixed reality processing computing entity 106 to generate three-dimensional interface data.

Returning to FIG. 4, at step/operation 409, the carrier engine 428 processes the environment modeling data object along with the intent determination data object to generate a three-dimensional rendering input and provides the three-dimensional rendering input to the three-dimensional rendering engine 429. The three-dimensional rendering input may include, in addition to the environment modeling data object, at least one of the following: (i) overlay dimension data for an AR/mixed reality overlay, (ii) final pose estimation data for each detected object in the environment of interest, (iii) augment parameters for an AR/mixed reality augment, (iv) WLOP refresh rate for a WLOP noise filtering routine utilized by the noise filtering engine 425, and (v) infra cloud control point data for an AR/mixed reality overlay.

At step/operation 410, the carrier engine 428 processes the three-dimensional rendering input to generate a three-dimensional rendering output, which may then be used by a client computing entity 102 (e.g., an AR/mixed reality client computing entity) to generate a three-dimensional rendering user interface. The three-dimensional rendering output may describe at least one of: (i) spatial data (e.g., data describing planes, data associated with an occlusion manager, data associated with a three-dimensional mesh controller, lightning data, physics engine data, control points for multiple property interactions, and/or the like), or (ii) dynamic data (e.g., data generated based at least in part on converting the environment modeling data object to controllable surface data, data associated with a content dimension manager that controls final rendering of a scene and its properties, dynamic scene rendering data which enable rendering a static scene in accordance with a final prepared augment environment). Generating the three-dimensional rendering output is an example of a rendering-based action. Other examples of rendering-based actions include generating three-dimensional rendering user interfaces (including three-dimensional MR user interfaces), updating three-dimensional rendering user interfaces (including three-dimensional MR user interfaces), updating configuration data for a three-dimensional rendering output (including a three-dimensional MR rendering output) based at least in part on user-selected anchor point definition data, and/or the like.

Figure 11A:
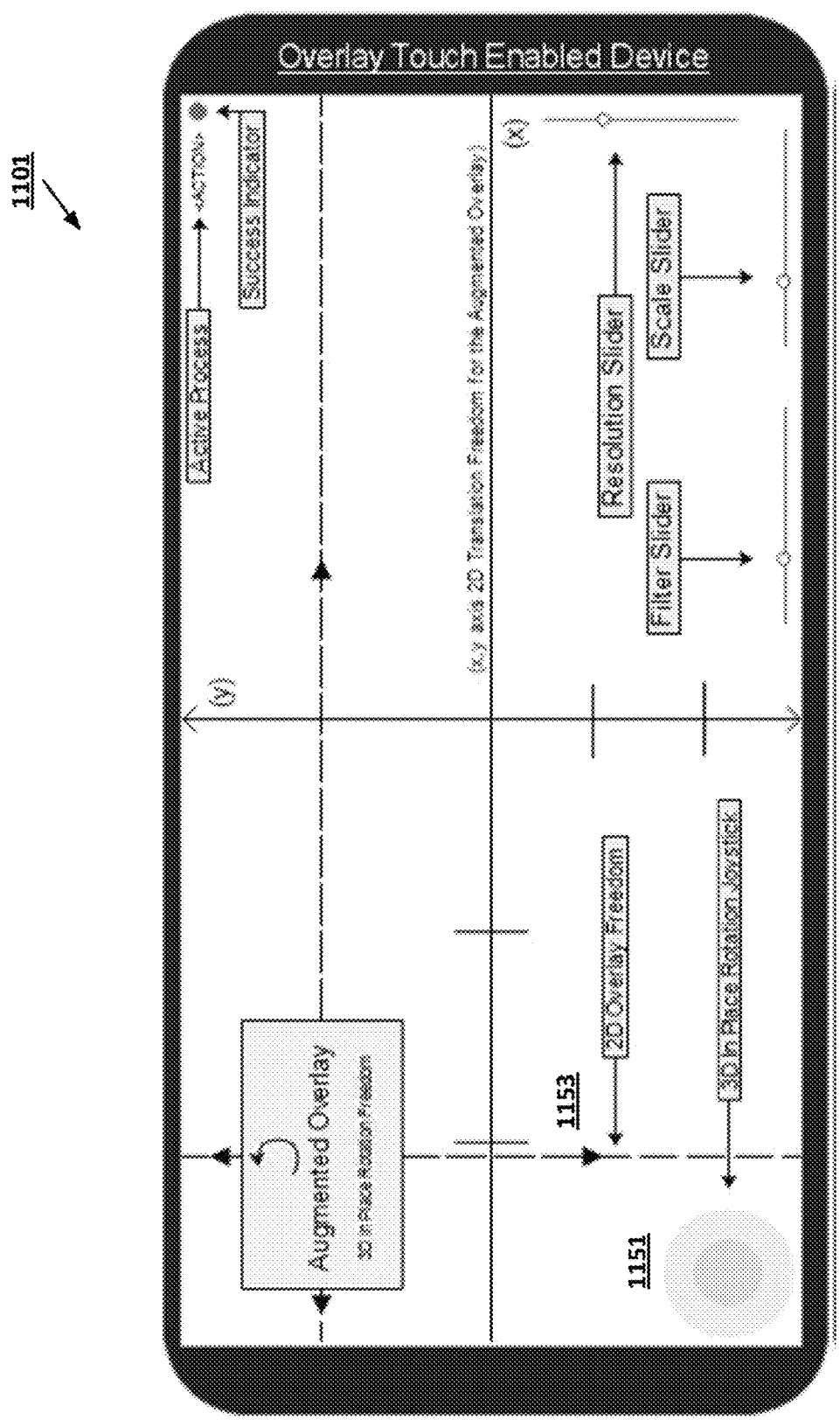
Figure 11B:
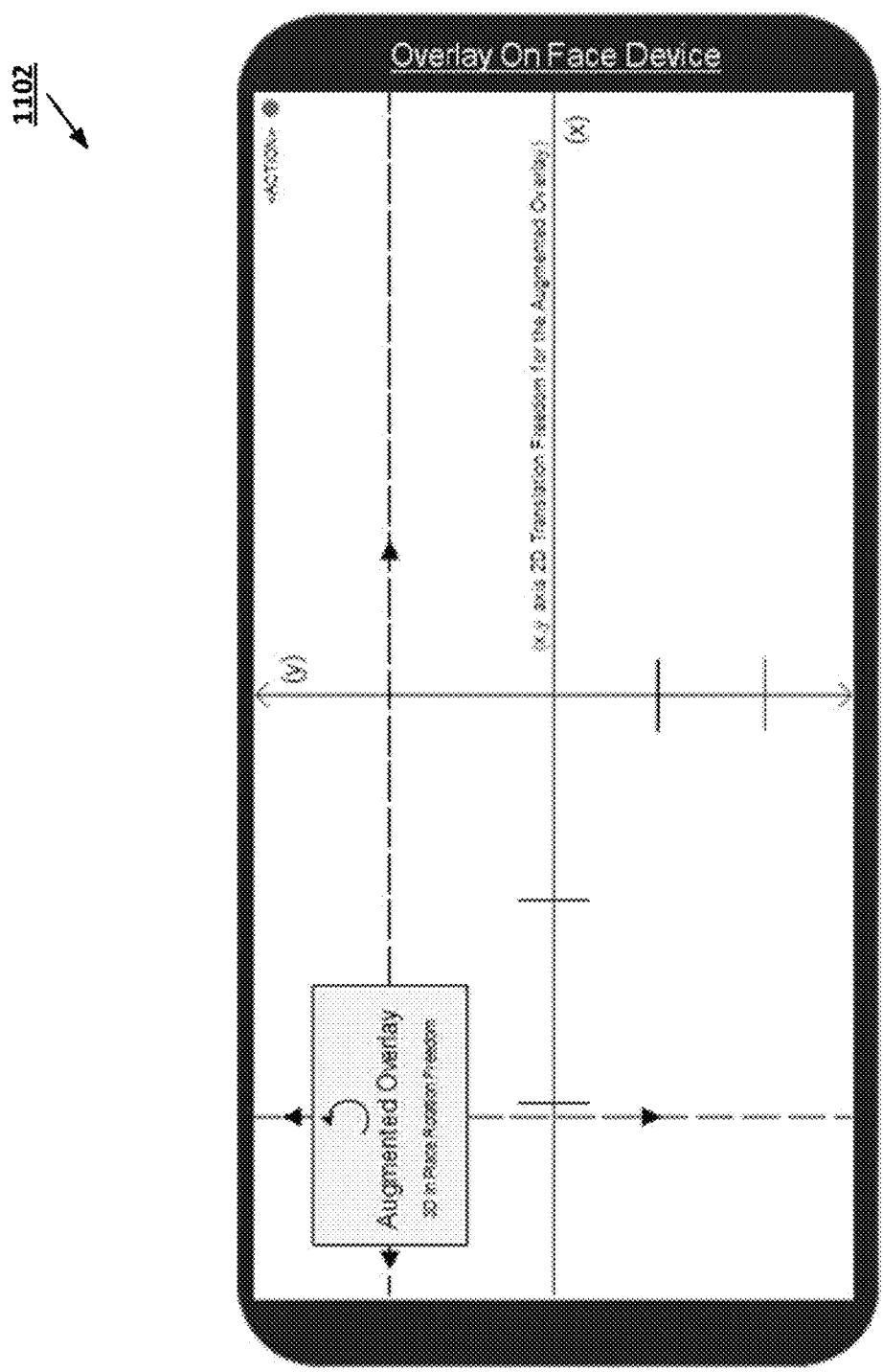
Figure 11C:
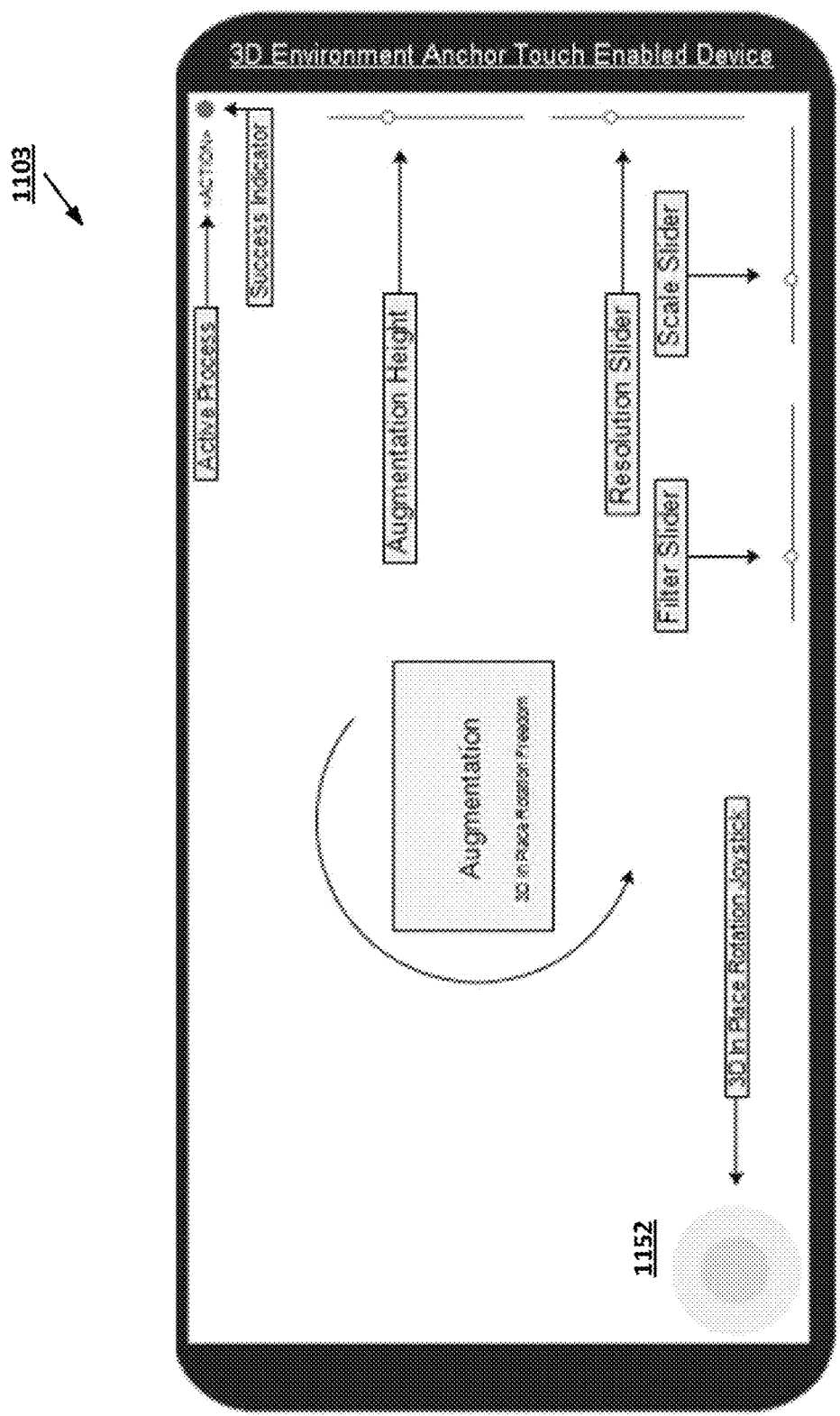
Figure 11D:
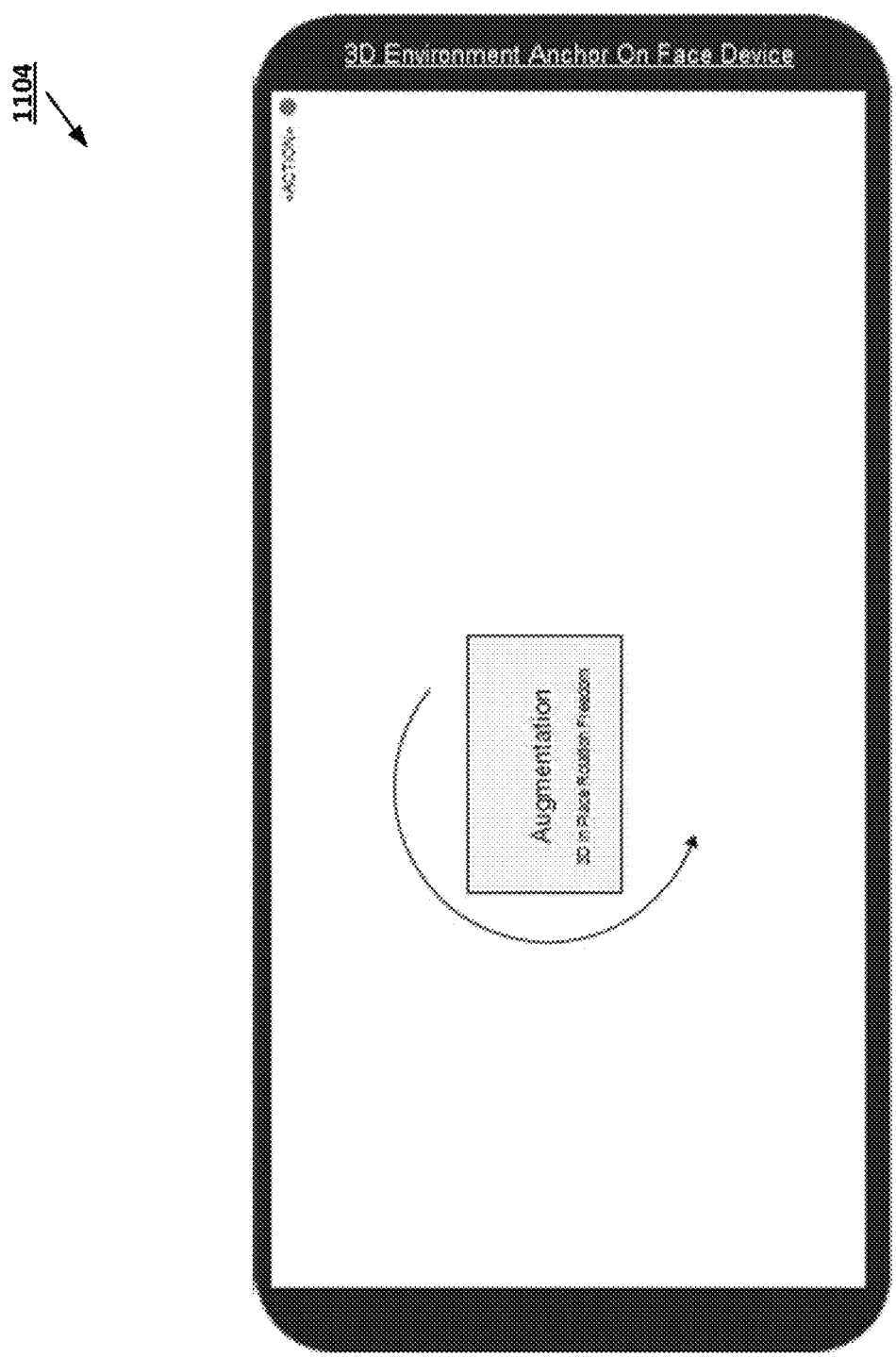

Operational examples of three-dimensional rendering user interfaces 1101-1104 are depicted in FIGS. 11A-11D. As depicted in FIGS. 11A-11D, the three-dimensional rendering user interfaces 1101-1104 enable augmentation in the three-dimensional environment using a three-dimensional anchor point in the depicted three-dimensional environment (e.g., by using the interface elements 1151-1152). As depicted in FIGS. 11A-11B, the three-dimensional rendering user interfaces 1101-1102 enable augmentation in the three-dimensional environment using a two-dimensional point in the two-dimensional plane (e.g., by using user interface element 1153).

Exemplary Techniques for Point Cloud Portioning

FIG. 12 is a flowchart diagram of an example process 1200 for generating a plurality of object-based point cloud partitions. Via the various steps/operations of the process 1200, the mixed reality processing computing entity 106 generates a plurality of object-based point cloud partitions for a point cloud capture data object associated with the area of interest. In some embodiments, to generate point cloud partitions, the mixed reality processing computing entity 106 first generates the point cloud capture data object based at least in part on the RGB data, the inertial measurement data, and the infrared phase shift data associated with an environment of interest, and then performs phase-shift layering on the point cloud capture data object based at least in part on the phase shift data to generate the plurality of object-based point cloud partitions.

The process 1200 begins at step/operation 1201 when the mixed reality processing computing entity 106 generates a set of RGB-based features based at least in part on the RGB data obtained from the environmental/sensory data generation unit 421. In some embodiments, the mixed reality processing computing entity 106 performs image processing on RGB data associated with an environment of interest to generate the set of RGB-based features.

At step/operation 1202, the mixed reality processing computing entity 106 generates a set of depth shift series based at least in part on the infrared phase shift data. In some embodiments, the mixed reality processing computing entity 106 performs localization on the infrared phase shift data to generate a set of localized shift series, and subsequently generates the set of depth shift series based at least in part on the set of localized shift series.

At step/operation 1203, the mixed reality processing computing entity 106 generates a point cloud capture data object associated with the area of interest based at least in part on the set of RGB-based features, the set of depth shift series, and the inertial measurement unit data. A point cloud capture data object may describe recorded data (e.g., recorded location-describing data, recorded color-describing data, and/or the like) associated with a group of recorded points associated with a corresponding environment of interest. In some embodiments, generating the point cloud capture data object for an environment of interest is performed based at least in part on a set of RGB-based features associated with the environment of interest, a set of depth shift series associated with the environment of interest, and the inertial measurement unit data associated with the environment of interest. For example, in some embodiments, to generate a point cloud capture data object associated with an environment of interest, localized static point propagation is performed on the inertial measurement data associated with the environment of interest, and subsequently the output of the localized static point propagation is combined with a set of RGB-based features associated with the environment of interest and a set of depth shift series associated with the environment of interest to generate the point cloud capture data object associated with the environment of interest.

At step/operation 1204, the mixed reality processing computing entity 106 generates a plurality of plurality of depth-based point cloud partitions for the point cloud capture data object based at least in part on the set of depth shift series and/or based at least in part on the infrared phase shift data. In some embodiments, to generate the plurality of depth-based point cloud partitions, the mixed reality processing computing entity 106: (i) generates an inferred depth value for each point described by the point cloud capture data object based at least in part on the set of depth shift series and/or based at least in part on the infrared phase shift data, and (ii) generates each depth-based point cloud partition as a subset of the points described by the point cloud capture data object whose inferred depth values falls within a defined inferred depth value range.

In some embodiments, a depth-based point cloud partition may describe a subset of points described by a corresponding point cloud capture data object whose inferred depth values fall within a defined inferred depth value range, where an inferred depth value for a point may be determined based at least in part on a distance between a corresponding location of a point and a tracking location within an environment of interest (e.g., a tracking location that describes the location of the vantage point of an image capturing device within the environment of interest) as described by the infrared phase shift data associated with the environment of interest. For example, in a surgical environment of interest, the mixed reality processing computing entity 106 may generate a plurality of depth-based point cloud partitions for a point cloud capture data object for the surgical environment of interest based at least in part on inferred distances between the vantage point of an image capturing device in the surgical environment of interest that is configured to be worn by a human agent (e.g., a surgeon) operating within the surgical environment of interest and one or more recorded points detected within the surgical environment of interest, including one or more points that may be deemed to be associated with one or more surgical instrument objects of interest that are present within the surgical environment of interest. Accordingly, after generating a group of depth-based point cloud partitions, each recorded point of a corresponding point cloud capture data object may be associated with a depth-based point cloud partition of the group of depth-based point cloud partitions, where the depth-based point cloud partition may be determined based at least in part on an inferred distance of the particular recorded point from a tracking location within the environment of interest as described by the infrared phase shift data associated with the environment of interest.

At step/operation 1205, the mixed reality processing computing entity 106 generates the plurality of object-based point cloud partitions for the point cloud capture data object based at least in part on the plurality of depth-based point cloud partitions for the point cloud capture data object. In some embodiments, to generate the plurality of object-based point cloud partitions, the mixed reality processing computing entity 106 detects any object outer linings within each depth-based point cloud partition to generate a whole plane distribution based at least in part on object movement patterns as described by the RGB-based features associated with the corresponding environment of interest and object depth patterns as described by the set of depth shift series for the corresponding environment of interest.

In some embodiments, an object-based point cloud partition may describe a subset of recorded points associated with a point cloud capture data object that are deemed to be associated with one or more detected/expected objects that are deemed to be physically present within a corresponding environment of interest. For example, an object-based point cloud partition may describe a depth-based point cloud partition that may be deemed to include one or more objects within a corresponding environment of interest, such as an object-based point cloud partition of a point cloud capture data object associated with a surgical environment of interest that is a depth-based point cloud partition for the point cloud capture data object that is deemed to include a surgical instrument object, an object-based point cloud partition of a point cloud capture data object associated with a surgical environment of interest that is a depth-based point cloud partition for the point cloud capture data object that is deemed to include a surgical instrument object and a surgeon hand object, or an object-based point cloud partition of a point cloud capture data object associated with a surgical environment of interest that is a depth-based point cloud partition for the point cloud capture data object that is deemed to include a patient upper body object, and/or the like.

Exemplary Techniques for Three-Dimensional Mapping Across Point Clouds and Images FIG. 13 is a flowchart diagram of an example process 1300 for generating an environment mapping data object based at least in part on a plurality of object-based point cloud partitions for a point cloud capture data object. Via the various steps/operations of the process 1300, the mixed reality processing computing entity 106 can process the plurality of object-based point cloud partitions for the point cloud capture data object associated with the environment of interest in accordance with a three-dimensional scan data object for the corresponding environment of interest to generate, for each detected object associated with the point cloud capture data object as described by the plurality of object-based point cloud partitions, an environmental mapping data object.

The process 1300 begins at step/operation 1301 when the mixed reality processing computing entity 106 performs one or more scene analysis operations on the three-dimensional scan data object for the corresponding environment of interest to generate a scan configuration data object for the three-dimensional scan data object. The scan configuration data object may describe one or more parameters determined based at least in part on three-dimensional geometric values of the three-dimensional scan data object. In some embodiments, the scene analysis operations performed on a three-dimensional scan data object in order to generate the scan configuration data object for the three-dimensional scan data object include at least one of the following: (i) mapping anchor points in a corresponding three-dimensional scene to the three-dimensional scan data object in order to generate an anchored three-dimensional scan data object, (ii) generating three-dimensional geometric values for the three-dimensional scene based at least in part on the anchored three-dimensional scan data object, (iii) generating geometrical parameters for the anchored three-dimensional scan data object, and (iv) generating the scan configuration data object based at least in part on the geometrical parameters for the anchored three-dimensional scan data object.

At step/operation 1302, the mixed reality processing computing entity 106 maps each detected object associated with the point cloud capture data object as described by the plurality of object-based point cloud partitions to the three-dimensional scan data object based at least in part on the scan configuration data object for the three-dimensional scan data object to generate a group of object-scan mappings. As described above, the plurality of object-based point cloud partitions may describe a group of detected objects mapped to a group of depth-based point cloud partitions of the point cloud capture data object. In some embodiments, at step/operation 1302, the mixed reality processing computing entity 106 maps each such detected object to a three-dimensional region of the three-dimensional scan data object.

In some embodiments, an object-scan mapping may describe mapping a three-dimensional region of a corresponding three-dimensional scan data object for a corresponding environment of interest to a corresponding detected object in the corresponding environment as described by a group of object-based point cloud partitions for a point cloud capture data object associated with the corresponding environment of interest. In some embodiments, to generate an object-scan mapping for a corresponding detected object, the mixed reality processing computing entity 106 is configured to perform at least one of the following operations: (i) generate a normal orientation for the three-dimensional scan data object (e.g., based at least in part on a predesignated normal orientation for the corresponding three-dimensional scene, such as a predesignated normal to a floor of the corresponding three-dimensional scene), (ii) generate a normal-adjusted orientation for the detected object based at least in part on the object-based point capture partition for the detected object, and (iii) map the corresponding detected object to a three-dimensional region of the three-dimensional scan data object based at least in part on the normal orientation for the three-dimensional scan data object and the normal-adjusted orientation for the noted detected object.

At step/operation 1303, the mixed reality processing computing entity 106 generates, for each detected object associated with the point cloud capture data object as described by the plurality of object-based point cloud partitions, the environment mapping data object for the detected object based at least in part on the object-scan mapping for the detected object. The environment mapping data object for a detected object may describe geometric data (e.g., geometric shape data, geometric orientation data, and/or the like) for the detected object, where the geometric data for the detected object may be inferred based at least in part on a scan configuration data object for a three-dimensional scan data object associated with an environment of interest that includes the object of interest. In some embodiments, to generate the environment mapping data object for a detected object, the mixed reality processing computing entity 106: (i) maps the detected object to a three-dimensional region of a three-dimensional scan data object for a corresponding environment of interest using an object-scan mapping for the detected object, (ii) determines one or more environment properties of the three-dimensional region based at least in part on a scan configuration data object for the three-dimensional scan data object, and (iii) determines the environment mapping data object for the detected based object based at least in part on the determined environment properties of the three-dimensional region corresponding to the detected object.

Exemplary Techniques for Geometrically-Aware Point Cloud Refinement

FIG. 14 is a flowchart diagram of an example process 1400 for generating a plurality of refined point cloud partitions. Via the various steps/operations of the process 1400, the mixed reality processing computing entity 106 may process a plurality of object-based point cloud partitions based at least in part on the environment mapping data objects for the group of detected objects described by the plurality of object-based point cloud partitions in order to generate a plurality of refined point cloud partitions for the corresponding point cloud capture data object.

The process 1400 begins at step/operation 1401 when the mixed reality processing computing entity 106 identifies the plurality of object-based point cloud partitions. In some embodiments, the mixed reality processing computing entity 106 generates an object-based point cloud partition data entity based at least in part on each object-based point cloud partition of the plurality of object-based point cloud partitions.

At step/operation 1402, the mixed reality processing computing entity 106 performs one or more preprocessing operations on each object-based point cloud partition of the plurality of object-based point cloud partitions in accordance with a required WLOP output to generate a preprocessed object-based point cloud partition of a plurality of preprocessed object-based point cloud partitions. In some embodiments, to generate a preprocessed object-based point cloud partition, the corresponding object-based point cloud partition is transformed to have a structure/format of an expected output of a WLOP model for the corresponding point cloud partition that includes the corresponding object-based point cloud partition.

At step/operation 1403, the mixed reality processing computing entity 106 performs one or more WLOP filtering operations on the plurality of preprocessed object-based point cloud partitions in accordance with the environment mapping data objects for the group of detected objects described by the corresponding object-based point cloud partitions in order to generate the plurality of refined point cloud partitions. In some embodiments, to perform step/operation 803, noise-filtered point cloud capture data object: (i) performs a fixed number of WLOP operation iterations to generate a refined point cloud capture data object, where each WLOP operation iteration point filtering is performed based at least in part on geometric data associated with detected objects as described by the environment mapping data objects for the detected objects, and (ii) after the fixed number of WLOP operation iterations, performs one or more depth-based partitioning operations (e.g., as described above with reference to step/operation 604 of the process that is depicted in FIG. 6) is performed on the refined point cloud capture data object to generate the plurality of refined point cloud partitions.

A refined point cloud partition may be any subset of the points described by a corresponding refined point cloud capture data object. As described above, in some embodiments, depth-based partitioning is performed on the refined point cloud capture data object to generate the plurality of refined point cloud partitions. In some embodiments, to perform the noted depth-based partitioning operations, the mixed reality processing computing entity 106: (i) generates an inferred depth value for each point described by the refined point cloud capture data object based at least in part on the set of depth shift series and/or based at least in part on the infrared phase shift data, and (ii) generates each depth-based point cloud partition as a subset of the points described by the refined point cloud capture data object whose inferred depth values fall within a defined inferred depth value range. For example, in a surgical environment of interest, the mixed reality processing computing entity 106 may generate a plurality of refined point cloud partitions for a refined point cloud capture data object for the surgical environment of interest based at least in part on inferred distances between the vantage point of an image capturing device in the surgical environment of interest that is configured to be worn by a human agent (e.g., a surgeon) operating within the surgical environment of interest and one or more recorded points detected within the surgical environment of interest, including one or more points that may be deemed to be associated with one or more surgical instrument objects of interest that are present within the surgical environment of interest. Accordingly, after generating a group of refined point cloud partitions, each recorded point of a corresponding refined point cloud capture data object may be associated with a refined point cloud partition of the group of refined point cloud partitions based at least in part on an inferred distance of the particular recorded point from a tracking location within the environment of interest as described by the infrared phase shift data associated with the environment of interest.

Exemplary Techniques for Object Detection Using Iterative Continual Mapping

FIG. 15 is a flowchart diagram of an example process 1500 for generating a target environment modeling data object based at least in part on a plurality of object-based point cloud partitions (e.g., a plurality of refined point cloud partitions). Via the various steps/operations of the process 1500, the mixed reality processing computing entity 106 may (i) process the plurality of point cloud partitions to detect a set of objects including a set of high movement objects and a set of low movement objects, and (ii) generate the environment modeling data object based at least in part on distance parameters associated with objects pairs from the set of objects, orientation parameters for the set of objects, velocity parameters of set of high movement objects, and a target area of interest in the environment of interest.

The process 1500 begins at steps/operations 1501-1502 when the mixed reality processing computing entity 106 detects a set of high movement objects and a set of low movement objects correspondingly based at least in part on the plurality of refined point cloud partitions. In some embodiments, to detect the set of high movement objects and/or the set of low movement objects based at least in part on the plurality of refined point cloud partitions, the mixed reality processing computing entity 106: (i) generates a set of splits based at least in part on the plurality of refined point cloud partitions, where a split may be a segment of an object-based point cloud capture data object associated with the plurality of refined point cloud partitions that falls within one or more refined point cloud partitions of the plurality of refined point cloud partitions and is deemed to include an object; (ii) for each split of the set of splits, determines a movement measure relative to a field of view in the corresponding environment of interest (e.g., a field of view of an mixed reality/AR device); (iii) classifies the objects associated with splits whose movement measures satisfy (e.g., fall above or fail to fall below) a movement measure threshold as high movement sets, and (iv) classifies objects associated with splits whose movement measures fail to satisfy (e.g., fail to fall above or fall below) a movement measure threshold as low movement objects.

In general, a high movement object may describe a detected object within an environment of interest whose movement patterns indicate the threshold-satisfying mobility of the detected object. As described above, to detect a set of high movement objects based at least in part on the plurality of refined point cloud partitions, the mixed reality processing computing entity 106 may: (i) generate a set of splits based at least in part on the plurality of refined point cloud partitions, where a split may be a segment of an object-based point cloud capture data object associated with the plurality of refined point cloud partitions that falls within one or more refined point cloud partitions of the plurality of refined point cloud partitions and is deemed to include an object; (ii) for each split of the set of splits, determine a movement measure relative to a field of view in the corresponding environment of interest (e.g., a field of view of an mixed reality/AR device); and (iii) classify the objects associated with splits whose movement measures satisfy (e.g., fall above or fail to fall below) a movement measure threshold as high movement sets. An example of a high movement object is a surgeon hand and/or a surgical instrument in a surgical environment of interest.

Moreover, a low movement object may describe a detected object within an environment of interest whose movement patterns indicate the non-threshold-satisfying mobility of the detected object. As described above, to detect a set of low movement objects based at least in part on the plurality of refined point cloud partitions, the mixed reality processing computing entity 106 may: (i) generate a set of splits based at least in part on the plurality of refined point cloud partitions, where a split may be a segment of an object-based point cloud capture data object associated with the plurality of refined point cloud partitions that falls within one or more refined point cloud partitions of the plurality of refined point cloud partitions and is deemed to include an object; (ii) for each split of the set of splits, determines a movement measure relative to a field of view in the corresponding environment of interest (e.g., a field of view of an mixed reality/AR device); and (iii) classify objects associated with splits whose movement measures fail to satisfy (e.g., fail to fall above or fall below) a movement measure threshold as low movement objects. An example of a low movement object is a body and/or a body part in a surgical environment of interest.

In some embodiments, to detect an object based at least in part on the plurality of refined point cloud partitions, the mixed reality processing computing entity 106: (i) generates a continual mapping data object for a corresponding refined point cloud capture associated with the plurality of refined point cloud partitions based at least in part on the corresponding refined point cloud capture, (ii) processes the continual mapping using a required number of outline matching iterations, where during each outline matching iteration the mixed reality processing computing entity 106 adjusts an existing continual mapping data object provided as an input to the outline matching iteration by: (a) performing object outline detection on the existing continual mapping data object based at least in part on the environment mapping data objects for the group of detected objects associated with the plurality of refined point cloud partitions in order to detect a set of inferred object outlines in the existing continual mapping data object, and (b) adding the set of inferred object outlines to the existing continual mapping data object to generate an updated continual mapping data object which is an output of the outline matching iteration. In some embodiments, performing the required number of outline matching iterations includes performing successive outline matching iterations until an outline matching iteration that results in a continual mapping data object whose set of inferred object outlines have an outline matching similarity measure in relation to the one or more geometric properties of the detected objects described by the environment mapping data objects that satisfies (e.g., falls above) an outline matching similarity measure threshold.

At step/operation 1503, the mixed reality processing computing entity 106 generates the target environment modeling data object based at least in part on the high movement objects and the low movement objects. In some embodiments, to generate the target environment modeling data object, the mixed reality processing computing entity 106 first generates a set of visualization parameters for the set of high movement objects and the set of low movement objects. Examples of visualization parameters include at least one of the following: (i) for each pair of detected objects, a distance visualization parameter that describes a recommended visual distance of the detected objects, (ii) for each detected object, an orientation parameter, (iii) for each detected object, a velocity parameter, and (v) for each detected object, a depth parameter. The mixed reality processing computing entity 106 may then generate the target environment modeling data object based at least in part on the set of visualization parameters.

In some embodiments, a target environment modeling data object may describe a visual representation of an environment of interest that is determined based at least in part on performing continual mapping on point cloud partitions associated with a point cloud capture data object for the environment of interest. As described above, the mixed reality processing computing entity 106 may generate the target environment modeling data object based at least in part on the set of visualization parameters. Examples of visualization parameters include at least one of the following: (i) for each pair of detected objects associated with an environment of interest, a distance visualization parameter that describes a recommended visual distance of the detected objects, (ii) for each detected object associated with an environment of interest, an orientation parameter, (iii) for each detected object associated with an environment of interest, a velocity parameter, and (v) for each detected object associated with an environment of interest, a depth parameter.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for performing mixed reality processing, the computer-implemented method comprising:
   identifying, using one or more processors, one or more input point cloud partitions associated with an input point cloud capture data object of an environment of interest;
   identifying, using one or more processors, one or more geometric features for each target object of a plurality of target objects in the environment of interest, wherein the plurality of target objects comprise one or more low movement target objects and one or more high movement target objects;
   determining, using the one or more processors and based at least in part on the one or more input point cloud partitions, one or more low movement detected objects in the environment of interest and one or more high movement detected objects in the environment of interest;
   determining, using the one or more processors, a continual mapping data object for the environment of interest by mapping the one or more low movement detected objects to the one or more low movement target objects and the one or more high movement detected objects to the one or more high movement detected objects;
   determining, using the one or more processors, a mixed reality output based at least in part on the continual mapping data object; and
   performing, using the one or more processors, one or more rendering-based actions based at least in part on the mixed reality output.

2. The computer-implemented method of claim 1, wherein determining the mixed reality output comprises:
   processing the continual mapping data object using a required number of outline matching operations until a terminal outline matching iteration that results in a continual mapping data object that is associated with a set of inferred object outlines having a threshold-satisfying outline matching similarity measure in relation to one or more geometric properties of the plurality of target objects; and
   generating the mixed reality output based at least in part on the terminal continual mapping data object.

3. The computer-implemented method of claim 2, wherein the set of inferred object outlines correspond to a set of user-defined object types.

4. The computer-implemented method of claim 3, wherein the set of user-defined object types comprise a hand object type.

5. The computer-implemented method of claim 3, wherein the set of user-defined object types comprise a body object type.

6. The computer-implemented method of claim 3, wherein the set of user-defined object types comprise a surgical instrument object type.

7. The computer-implemented method of claim 3, wherein the set of user-defined object types comprise a body part object type.

8. The computer-implemented method of claim 3, wherein the set of user-defined object types are determined based at least in part on an intent determination data object for an end user profile in the environment of interest.

9. The computer-implemented method of claim 8, wherein the intent determination data object is determined based at least in part on processing eye tracking data associated with the end user profile to identify a focal point of interest for the end user profile.

10. The computer-implemented method of claim 1, wherein generating the one or more input point cloud partitions comprises:
   identifying the input point cloud capture data object associated with the environment of interest, wherein:
      (i) the input point cloud capture data object comprises a plurality of point cloud points, and (ii) each point cloud point of the plurality of point cloud points is associated with an inferred depth value;
   determining a plurality of depth-based point cloud partitions for the input point cloud capture data object based at least in part on each inferred depth-value for a point cloud point of the plurality of point cloud points;

for each depth-based point cloud partition of the plurality of depth-based point cloud partitions, determining whether the depth-based point cloud partition comprises a set of detected object outer linings;

generating a plurality of object-based point cloud partitions based at least in part on the plurality of depth-based point cloud partitions and each set of detected object outer linings for a depth-based point cloud partition of the plurality of depth-based point cloud partitions; and generating the one or more input point cloud partitions based on the plurality of object-based point cloud partitions.

11. An apparatus for performing mixed reality processing, the apparatus comprising at least one processor and at least one memory including program code, the at least one memory and the program code configured to, with the processor, cause the apparatus to at least:

identifying one or more input point cloud partitions associated with an input point cloud capture data object of an environment of interest;

identifying one or more geometric features for each target object of a plurality of target objects in the environment of interest, wherein the plurality of target objects comprise one or more low movement target objects and one or more high movement target objects;

determine, based at least in part on the one or more input point cloud partitions, one or more low movement detected objects in the environment of interest and one or more high movement detected objects in the environment of interest;

determine a continual mapping data object for the environment of interest by mapping the one or more low movement detected objects to the one or more low movement target objects and the one or more high movement detected objects to the one or more high movement detected objects;

determine a mixed reality output based at least in part on the continual mapping data object; and perform one or more rendering-based actions based at least in part on the mixed reality output.

12. The apparatus of claim 11, wherein determining the mixed reality output comprises:

processing the continual mapping data object using a required number of outline matching operations until a terminal outline matching iteration that results in a continual mapping data object that is associated with a set of inferred object outlines having a threshold-satisfying outline matching similarity measure in relation to one or more geometric properties of the plurality of target objects; and generating the mixed reality output based at least in part on the terminal continual mapping data object.

13. The apparatus of claim 12, wherein the set of inferred object outlines correspond to a set of user-defined object types.

14. The apparatus of claim 13, wherein the set of user-defined object types are determined based at least in part on an intent determination data object for an end user profile in the environment of interest.

15. The apparatus of claim 14, wherein the intent determination data object is determined based at least in part on processing eye tracking data associated with the end user profile to identify a focal point of interest for the end user profile.

16. The apparatus of claim 11, wherein generating the one or more input point cloud partitions comprises:

identifying the input point cloud capture data object associated with the environment of interest, wherein: (i) the input point cloud capture data object comprises a plurality of point cloud points, and (ii) each point cloud point of the plurality of point cloud points is associated with an inferred depth value;

determining a plurality of depth-based point cloud partitions for the input point cloud capture data object based at least in part on each inferred depth-value for a point cloud point of the plurality of point cloud points;

for each depth-based point cloud partition of the plurality of depth-based point cloud partitions, determining whether the depth-based point cloud partition comprises a set of detected object outer linings;

generating a plurality of object-based point cloud partitions based at least in part on the plurality of depth-based point cloud partitions and each set of detected object outer linings for a depth-based point cloud partition of the plurality of depth-based point cloud partitions; and generating the one or more input point cloud partitions based on the plurality of object-based point cloud partitions.

17. A computer program product for performing mixed reality processing, the computer program product comprising at least one non-transitory computer-readable storage medium having computer-readable program code portions stored therein, the computer-readable program code portions configured to:

identifying one or more input point cloud partitions associated with an input point cloud capture data object of an environment of interest;

identifying one or more geometric features for each target object of a plurality of target objects in the environment of interest, wherein the plurality of target objects comprise one or more low movement target objects and one or more high movement target objects;

determine, based at least in part on the one or more input point cloud partitions, one or more low movement detected objects in the environment of interest and one or more high movement detected objects in the environment of interest;

determine a continual mapping data object for the environment of interest by mapping the one or more low movement detected objects to the one or more low movement target objects and the one or more high movement detected objects to the one or more high movement detected objects;

determine a mixed reality output based at least in part on the continual mapping data object; and perform one or more rendering-based actions based at least in part on the mixed reality output.

18. The computer program product of claim 17, wherein determining the mixed reality output comprises:

processing the continual mapping data object using a required number of outline matching operations until a terminal outline matching iteration that results in a continual mapping data object that is associated with a set of inferred object outlines having a threshold-satisfying outline matching similarity measure in relation to one or more geometric properties of the plurality of target objects; and generating the mixed reality output based at least in part on the terminal continual mapping data object.

19. The computer program product of claim 18, wherein the set of inferred object outlines correspond to a set of user-defined object types.

20. The computer program product of claim 17, wherein generating the one or more input point cloud partitions comprises:

identifying the input point cloud capture data object associated with the environment of interest, wherein: (i) the input point cloud capture data object comprises a plurality of point cloud points, and (ii) each point cloud point of the plurality of point cloud points is associated with an inferred depth value;

determining a plurality of depth-based point cloud partitions for the input point cloud capture data object based at least in part on each inferred depth-value for a point cloud point of the plurality of point cloud points;

for each depth-based point cloud partition of the plurality of depth-based point cloud partitions, determining whether the depth-based point cloud partition comprises a set of detected object outer linings;

generating a plurality of object-based point cloud partitions based at least in part on the plurality of depth-based point cloud partitions and each set of detected object outer linings for a depth-based point cloud partition of the plurality of depth-based point cloud partitions; and generating the one or more input point cloud partitions based on the plurality of object-based point cloud partitions.

\* \* \* \* \*